United States Patent
Jing et al.

(10) Patent No.: US 12,195,003 B2
(45) Date of Patent: *Jan. 14, 2025

(54) VEHICLE POWERTRAIN INTEGRATED PREDICTIVE DYNAMIC CONTROL FOR AUTONOMOUS DRIVING

(71) Applicant: TUSIMPLE, INC., San Diego, CA (US)

(72) Inventors: Junbo Jing, San Diego, CA (US); Dinghua Li, San Diego, CA (US); Arda Kurt, San Diego, CA (US); Chasen Sherman, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,837

(22) Filed: Jun. 29, 2023

(65) Prior Publication Data
US 2023/0339473 A1 Oct. 26, 2023

Related U.S. Application Data

(63) Continuation of application No. 17/164,207, filed on Feb. 1, 2021, now Pat. No. 11,691,628.

(51) Int. Cl.
*B60W 30/19* (2012.01)
*B60W 60/00* (2020.01)
(Continued)

(52) U.S. Cl.
CPC .......... *B60W 30/19* (2013.01); *B60W 60/001* (2020.02); *G01C 21/3469* (2013.01);
(Continued)

(58) Field of Classification Search
CPC .............. B60W 30/19; B60W 60/001; B60W 2510/104; B60W 2510/105;
(Continued)

(56) References Cited

U.S. PATENT DOCUMENTS

| | | | | |
|---|---|---|---|---|
| 5,201,889 A | * | 4/1993 | Mason | B60W 10/06 701/64 |
| 2012/0072065 A1 | * | 3/2012 | Minamikawa | B60K 6/547 903/903 |

(Continued)

*Primary Examiner* — Thomas Ingram
*Assistant Examiner* — Faris Asim Shaikh
(74) *Attorney, Agent, or Firm* — Perkins Coie LLP

(57) ABSTRACT

Devices, systems, and methods for integrated predictive dynamic control of a vehicle powertrain in an autonomous vehicle are described. An example method for controlling a vehicle includes generating, based on performing an optimization on a blended smooth wheel domain fuel consumption map subject to a modified torque availability constraint, one or more wheel domain control commands, converting the one or more wheel domain control commands to one or more powertrain-executable engine domain control commands, and transmitting the one or more powertrain-executable engine domain control commands to a powertrain of the vehicle, the powertrain configured to operate a plurality of gears, wherein the one or more powertrain-executable engine domain control commands enable the vehicle to track a reference kinematic trajectory associated with a vehicle speed driving plan within a predetermined tolerance.

20 Claims, 16 Drawing Sheets

(51) Int. Cl.
    *G01C 21/34*    (2006.01)
    *G05D 1/00*    (2024.01)
(52) U.S. Cl.
    CPC ......... *G05D 1/0212* (2013.01); *G05D 1/0231* (2013.01); *B60W 2510/104* (2013.01); *B60W 2510/105* (2013.01); *B60W 2510/18* (2013.01)
(58) Field of Classification Search
    CPC ..... B60W 2510/18; B60W 2050/0026; B60W 2540/10; B60W 2720/103; B60W 2720/30; B60W 10/06; B60W 10/18; B60W 30/1882; B60W 50/0097; B60W 60/0013; B60W 60/0023; B60W 10/10; B60W 40/02; B60W 40/10; G01C 21/3469; G05D 1/0212; G05D 1/0231; G06Q 10/04; G05B 19/23; G05B 19/234; G05B 19/255; G05B 19/27; G05B 19/29; G05B 19/295; G05B 19/31; G05B 19/315; G05B 19/35; G05B 19/355; G05B 2219/34188; G05B 2219/37624; G05B 2219/39188; G05B 2219/39249; G05B 2219/43117; G05B 2219/42304; G05B 2219/43092; G05B 2219/43069; G05B 2219/43046; G05B 2219/43042; G05B 2219/42311; G05B 2219/41446; G05B 2219/42063; G05B 2219/42153; G05B 2219/41395; G05B 2219/41213; G05B 2219/41225
    See application file for complete search history.

(56) References Cited

U.S. PATENT DOCUMENTS

| | | | |
|---|---|---|---|
| 2016/0304080 A1* | 10/2016 | Sugiyama | B60W 20/12 |
| 2019/0361454 A1 | 11/2019 | Zeng et al. | |
| 2020/0089241 A1* | 3/2020 | Kao | G05D 1/0217 |
| 2020/0256460 A1* | 8/2020 | Naito | B60W 30/19 |
| 2020/0269845 A1* | 8/2020 | Hammarberg | B60W 10/10 |
| 2022/0242413 A1 | 8/2022 | Jing et al. | |

* cited by examiner

VEHICLE POWERTRAIN INTEGRATED PREDICTIVE DYNAMIC CONTROL FOR AUTONOMOUS DRIVING

CROSS-REFERENCE TO RELATED APPLICATIONS

This document is a continuation of U.S. patent application Ser. No. 17/164,207, filed on Feb. 1, 2021. The aforementioned application of which is incorporated by reference in its entirety.

TECHNICAL FIELD

This document generally relates to controlling vehicles, and in particular, generating computationally efficient powertrain control commands for autonomous vehicles.

BACKGROUND

Autonomous vehicle navigation is a technology for sensing the position and movement of a vehicle and, based on the sensing, autonomously control the vehicle to navigate towards a destination. Autonomous vehicle control and navigation can have important applications in transportation of people, goods and services. Efficiently generating commands for the powertrain of a vehicle that enable its accurate control is paramount for the safety of the vehicle and its passengers, as well as people and property in the vicinity of the vehicle, and for the operating efficiency of driving missions.

SUMMARY

Devices, systems and methods for integrated predictive dynamic control of a vehicle powertrain in an autonomous vehicle are described. In an example, this is achieved by efficiently calculating low-level powertrain control commands by using a blended fuel consumption map that overcomes the complexity of multiple switching systems, e.g., gear shifting. In another example, this is achieved by redefining the torque availability constraints with various gears for efficient control optimization solution by using a local affine approximation technique.

In an aspect, the disclosed technology can be used to provide a method for controlling a vehicle. This method includes generating, based on performing an optimization on a blended smooth wheel domain fuel consumption map subject to a modified torque availability constraint, one or more wheel domain control commands, converting the one or more wheel domain control commands to one or more powertrain-executable engine domain control commands, and transmitting the one or more powertrain-executable engine domain control commands to a powertrain of the vehicle, the powertrain configured to operate a plurality of gears, wherein the one or more powertrain-executable engine domain control commands enable the vehicle to track a reference kinematic trajectory associated with a vehicle speed driving plan within a predetermined tolerance, wherein the modified torque availability constraint is based on applying a local affine approximation to a plurality of torque availability constraints, each of the torque availability constraints corresponding to each of the plurality of gears.

In another aspect, the disclosed technology can be used to provide a method for controlling a vehicle. This method includes processing a plurality of waypoints for the vehicle, generating a reference kinematic trajectory for the vehicle that passes through each of the plurality of waypoints, generating a first plurality of commands to enable the vehicle to follow a longitudinal component of the reference kinematic trajectory, generating a second plurality of commands to enable the vehicle to follow a lateral component of the reference kinematic trajectory, and transmitting the first plurality of commands and the second plurality of commands to one or more braking components, one or more powertrain components, or one or more steering components of the vehicle, wherein a first set of computations for generating of the first plurality of commands is independent of a second set of computations for generating the second plurality of commands.

In yet another aspect, the disclosed technology can be used to provide a system for controlling a vehicle. This system includes a mission planning module that configured to process a plurality of waypoints for the vehicle, a control decoupler configured to generate a reference kinematic trajectory for the vehicle that passes through each of the plurality of waypoints, a longitudinal dynamic model predictive control (MPC) controller configured to generate a first plurality of commands to enable the vehicle to follow a longitudinal component of the reference kinematic trajectory, a lateral dynamic controller configured to generate a second plurality of commands to enable the vehicle to follow a lateral component of the reference kinematic trajectory, and a vehicle control interface configured to transmit the first plurality of commands and the second plurality of commands to one or more braking components, one or more powertrain components, or one or more steering components of the vehicle, wherein a first set of computations for generating of the first plurality of commands is independent of a second set of computations for generating the second plurality of commands.

In yet another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

Figure 1:
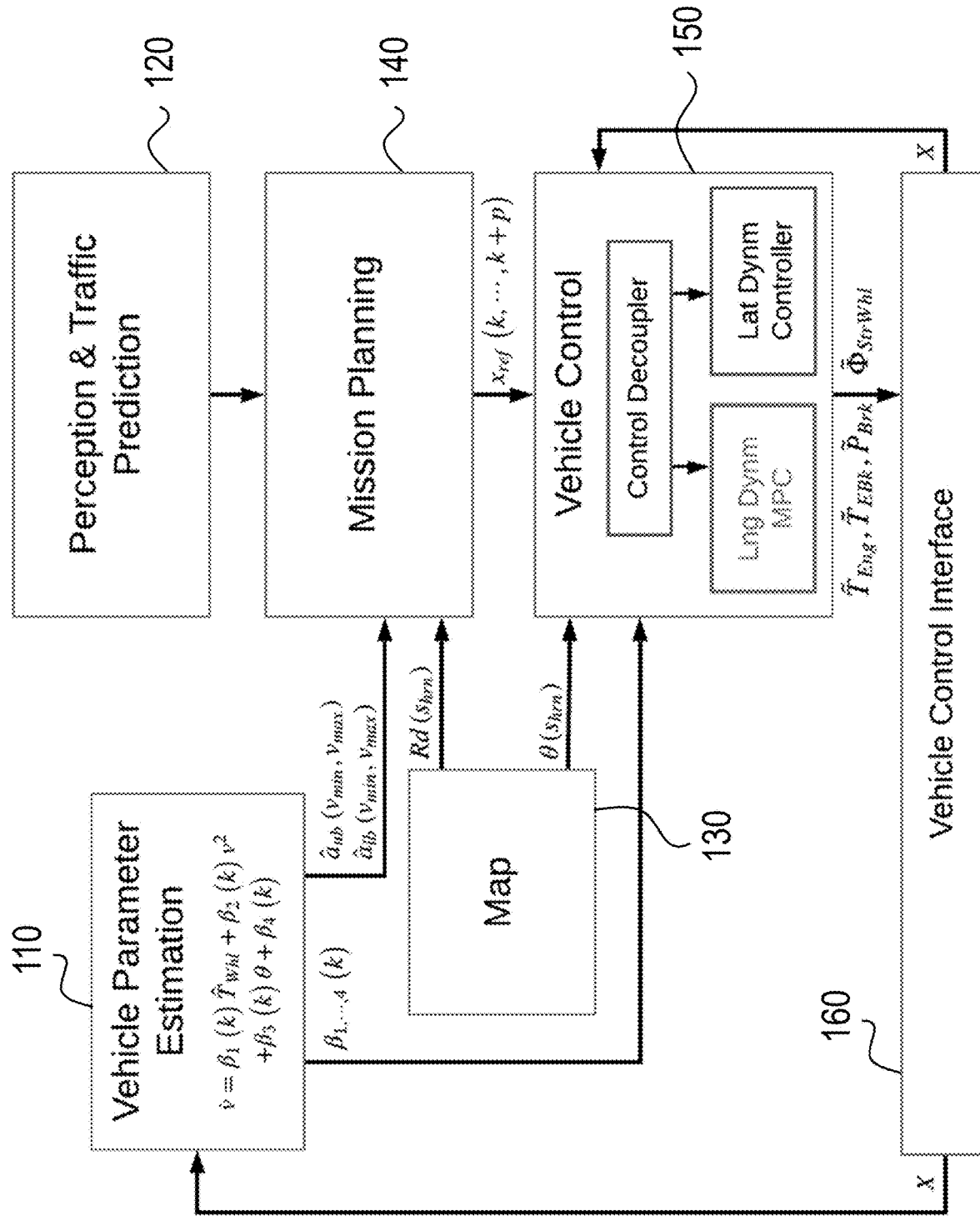
FIG. 1 shows a block diagram of the information dependency of a powertrain integrated predictive dynamic controller.

The transportation industry has been undergoing considerable changes in the way technology is used to control the operation of vehicles. As exemplified in the automotive passenger vehicle, there has been a general advancement towards shifting more of the operational and navigational decision making away from the human driver and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Different types of autonomous vehicles have been classified into different levels of automation under the Society of Automotive Engineers' (SAE) J3016 standard, which ranges from Level 0 in which the vehicle has no automation to Level 5 (L5) in which the vehicle has full autonomy. In an example, SAE Level 4 (L4) is characterized by the vehicle operating without human input or oversight but only under select conditions defined by factors such as road type or geographic area. In order to achieve SAE L4 autonomy, vehicle control commands must be efficiently computed while collaborating with both the high-level mission planner and the low-level powertrain characteristics and capabilities.

In existing autonomous and semi-autonomous systems, low-level powertrain control commands are typically generated to support adaptive cruise control (ACC), wherein the controller is designed to either maintain a constant driving speed on highway or to follow a lead vehicle while maintaining a safe distance between the vehicles. In such systems, the controller passively reacts to a control target and vehicle state situation, and the determination of vehicle actuations is driven by control errors. The control target normally only refers to a static driving speed in free cruise situations, or a dynamic driving speed determined only by the lead vehicle's instantaneous driving speed and the relative distance. In such cases, the control laws are normally designed to improve tracking accuracy, with other performance criteria being implicitly accounted for by control gain tuning. However, control gain tuning may inadvertently compromise tracking accuracy in some situations.

Embodiments of the disclosed technology are directed to the online determination of vehicular longitudinal actuations, e.g., throttle commands, brake commands, and gear commands, for any given vehicle longitudinal motion state. The determination of the actuations for a motion state advantageously enables the prediction of an acceleration, a speed, and/or a position of the vehicle, thereby enabling its accurate control.

The prediction and adaptation of powertrain commands is typically a dynamic process containing a continuous solution space. According to some embodiments, the described methods, devices, and systems are configured to generate specific vehicle actuation solutions that are close to the optimal solutions defined by a set of vehicular driving performance criteria, e.g., motion smoothness, target dynamic state tracking accuracy, running cost, etc.

In some embodiments, the described methods, devices, and systems are directed to SAE L4 autonomous driving dynamic control systems, which cover SAE L1-L3 driving assistance applications, semi-autonomous systems, and expand to the full coverage of vehicle dynamic control needs in real-world driving, which includes lane changes, merging into traffic, navigating highway on/off ramps, passing through intersections, maneuvering through congested traffic, parking and docking operations, etc. In contrast to conventional systems that focus on a single control target, embodiments of the disclosed technology are part of the processing of a control mission that involves control targets defined in multiple dimensions and which are typically time-varying.

Since the control target is a time-varying process, embodiments of the disclosed technology are configured to iteratively determine, based on the causal dynamic motion of the vehicle, a time-series for vehicle control actuation for vehicle states at a future time. Thus, instead of passively reacting to an instantaneous control error, the described embodiments proactively determine the current control actuations based on a projection to future vehicle driving states, future deviations from the required target driving profile, and the aggregated performance criteria of the future driving motion details.

In some embodiments, vehicle control actuations are generated for a target profile in multiple temporal dimensions and are also optimized to account for the co-existence of multiple performance criteria, e.g., tracking accuracy, state motion smoothness, actuation change smoothness, fuel economy, and brake preservation. This may be achieved by using model predictive control (MPC), which implements an iterative, finite-horizon optimization that explores state trajectories that emanate from the current state and selects the optimal trajectory until the finite-horizon. In the described embodiments, MPC is used to implement the predictive generation of the vehicle control actuations, which constantly evolve based on real-world driving situations deviating from trajectories generated by the high-level perception planning system.

FIG. 1 shows a block diagram of an example autonomous driving system that implements embodiments of the disclosed technology, which leverage the capabilities of MPC. As shown therein, an example autonomous driving system includes a vehicle parameter estimation module 110, a perception and traffic prediction module 120, a map module 130, a mission planning module 140, a vehicle control module 150, and a vehicle control interface 160. In some embodiments, the perception and traffic prediction module 120 can be configured to provide a context for driving situations, label the states of various nearby vehicles, identify instantaneous driving intentions, and predict future states of key neighboring vehicles. In some embodiments, the mission planning module 140 can be configured to use an abstracted ego vehicle motion model into the aforementioned driving situation context and generate an abstracted driving mission plan for a few seconds of time into the future.

In some embodiments, the vehicle control module 150 includes a control decoupler that is operably connected to the lateral dynamic controller and the longitudinal dynamic MPC, which generate control commands that are transmitted to the powertrain of the vehicle via the vehicle control interface 160. In other embodiments, the vehicle control interface 160 may also be configured to feedback time-series data from the powertrain and other engine domain and wheel domain components to the vehicle parameter estimation module 110.

Generating the vehicle control actuations is constrained by the maximum actuation capability of the vehicle. In contrast to control systems designed for SAE L3 and below (e.g., driving assistance and semi-autonomous driving) that requires the driver to take responsibility when a motion abnormality occurs, the disclosed embodiments are configured to provide full vehicle motion safety liability. In some embodiments, this may be achieved by investigating the state reachability and motion feasibility of the control scenario and modulating the vehicle state proactively in a time-varying manner subject to vehicle state constraints required by the autonomous driving planner for safety (e.g., minimum or maximum vehicular speed, position, or acceleration). Because the control actuation is proactively scheduled for future driving missions with consequence projection, the described embodiments can dynamically allocate vehicle actuation resources for future challenging motion events (e.g., prematurely configuring a high horsepower output phase), thereby achieving better state constraint compliance than conventional passive error-driven controllers.

In some embodiments, when an upper level state constraint may be beyond the nominal actuation capability of the vehicle, the infeasible state constraint may be relaxed by a minimum amount while maximizing the vehicle actuation using slack variable techniques, which minimize the possible risk at the output of the corresponding system module. This capability of fully utilizing the vehicle's output to be compliant with any required motion constraint to the maximum extent is one of the advantages of the described embodiments compared to conventional autonomous driving capabilities.

Figure 2:
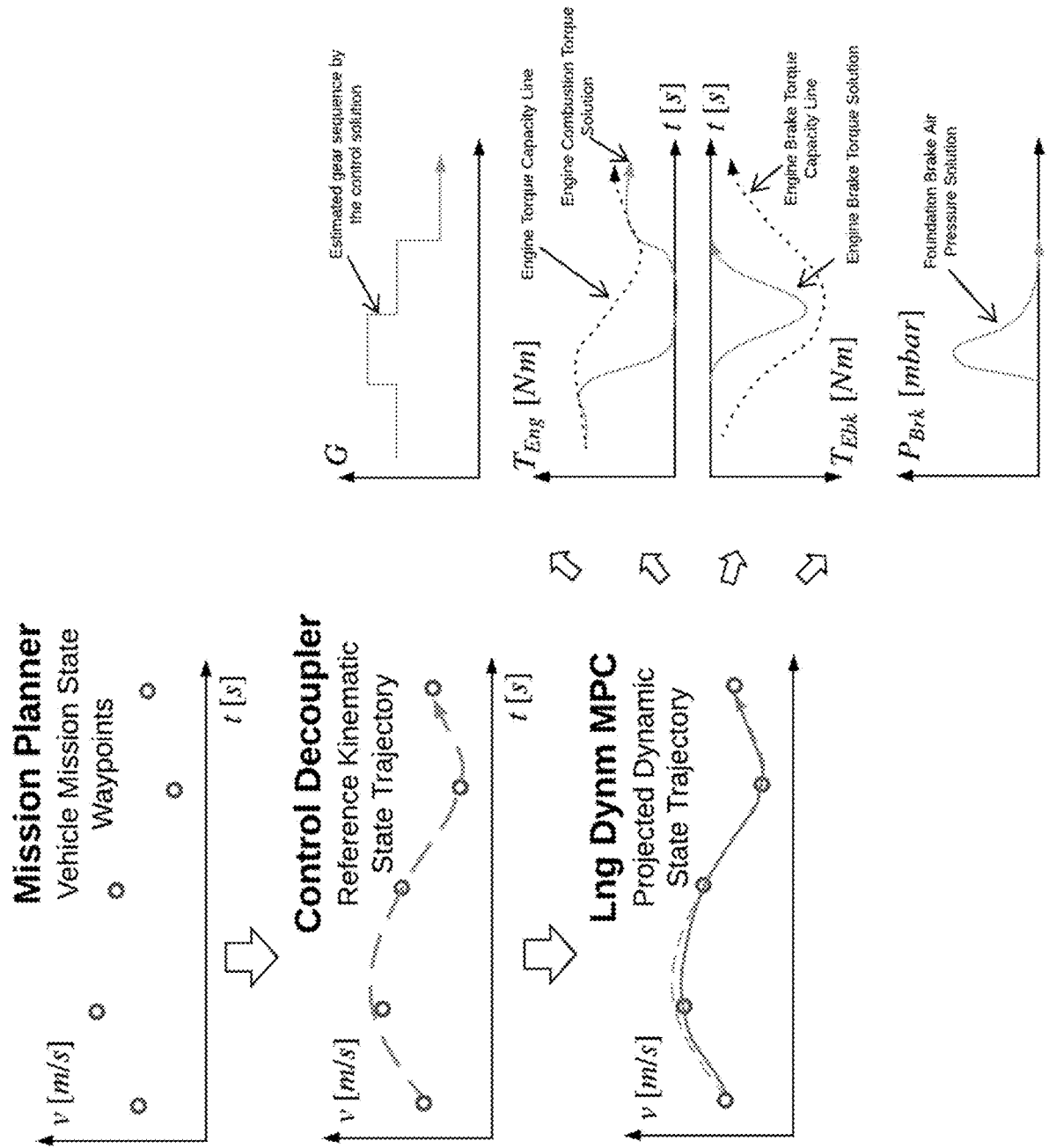
FIG. 2 shows an example of generating a low-level control sequence for a high-level driving mission demand using a powertrain integrated predictive dynamic controller.

FIG. 2 shows an example of generating a scheduled optimal control sequence for integrated predictive dynamic control of a vehicle powertrain and a vehicle foundation air brake in an autonomous vehicle based on an input which includes reference future states.

Examples of powertrain control commands include control commands for the gear sequence, engine combustion torque, and engine brake torque. The foundation air brake pressure is an example of the foundation brake control command. The disclosed embodiments can be implemented in a variety of autonomous vehicles, including class-8 trucks (which use foundation air brakes) as well as lighter-duty trucks (which use hydraulic brakes).

Continuing with the description of FIG. 2, the input from the mission planner (e.g., mission planning module 140 in FIG. 1), includes a series of vehicle mission waypoints in the form of a discrete velocity time-series. The mission planner is configured to provide this initial coarse mission plan or objective, which is subsequently refined to generate the scheduled optimal control sequence.

The control decoupler (e.g., in vehicle control module 150 in FIG. 1) then generates a reference kinematic state trajectory that passes through each of the vehicle mission waypoints. This represents a next stage of refinement in which the discrete waypoints are transformed to a continuous reference trajectory, which contains a lateral dimension and a longitudinal dimension. The lateral dimension of the reference kinematic state trajectory is processed by a lateral dynamic controller. The longitudinal dimension of the reference kinematic state trajectory is processed by a longitudinal dynamic MPC to generate a projected dynamic state trajectory that is a more realistic representation of the kinematic state trajectory that can be achieved given the vehicle's physical and control limitations. This represents a next stage of refinement in which the reference trajectory evolves into a realistic trajectory. The final stage of refinement generates multiple low-level control signals based on the projected dynamic state trajectory. As shown in FIG. 2, low-level control signals can include a gear sequence solution, an engine combustion torque solution, an engine brake torque solution, and a foundation brake air pressure solution.

The example implementation shown in FIG. 2 includes the iterative addition of complexity at each stage, which advantageously enables the final low-level control signals to be generated in a computationally efficient manner. Some conventional approaches generate low-level control signals directly from a mission plan, albeit at the expense of significantly more computational complexity.

Figure 3:
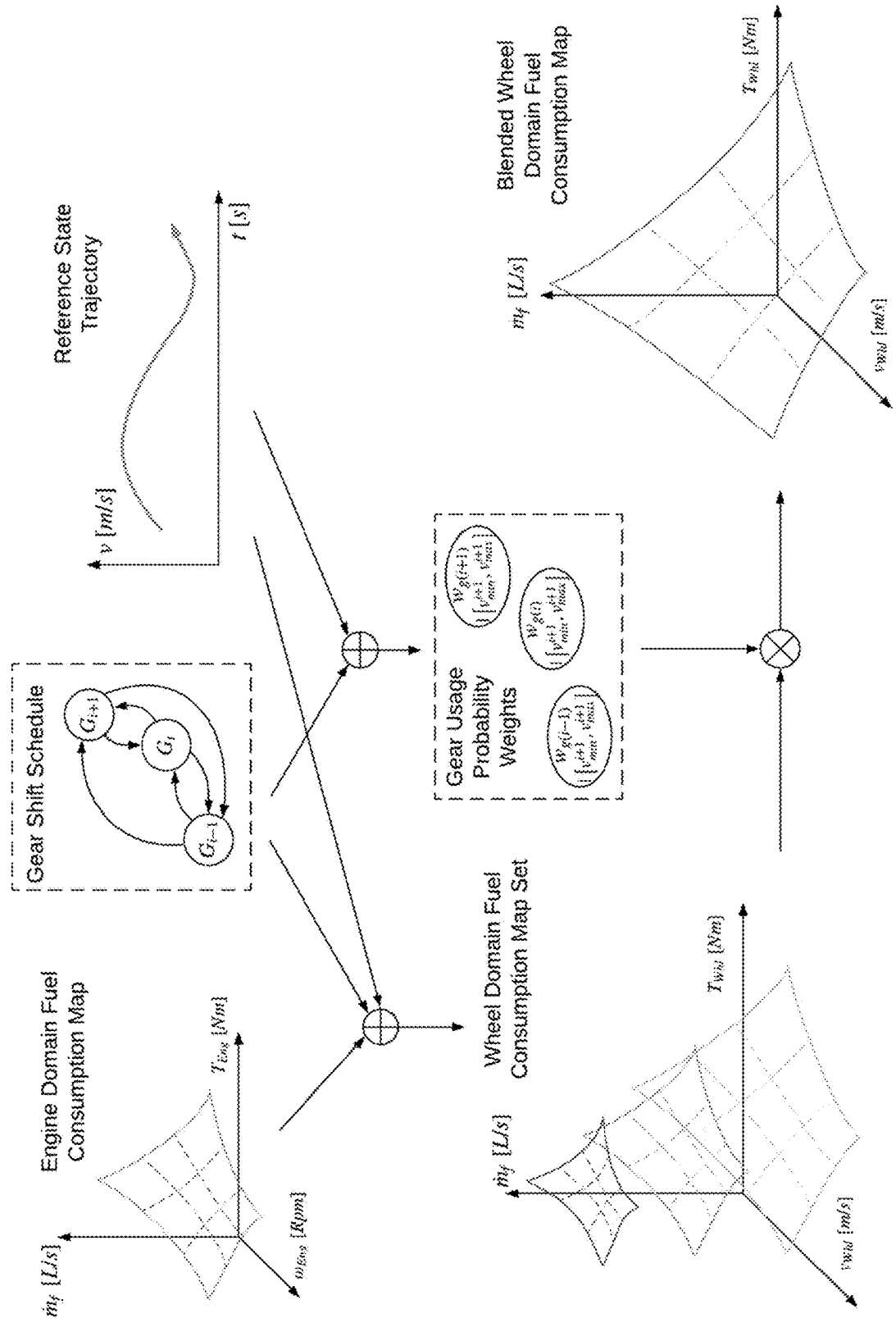
FIG. 3 shows an example of deriving a single blended smooth wheel domain fuel consumption map based on a weighted sum of engine domain fuel consumption maps.

FIG. 3 shows an example of deriving a blended wheel domain fuel consumption map based on a weighted sum of engine domain fuel consumption maps. As shown therein, the inputs include a reference state trajectory (e.g., the reference kinematic state trajectory generated by the control decoupler in FIG. 2), a gear shift schedule, which may be implemented and described as a finite state machine (FSM), and an engine domain fuel consumption map for each gear in the gear shift schedule. In an example, and as shown in FIG. 3, the engine domain fuel consumption map can be represented as a surface in an engine speed (in revolutions per minute) and engine torque (in Newton-meters) plane, with the height of the surface representing fuel consumption (in liters per second).

The gear shift schedule, the engine domain fuel consumption maps, and the reference state trajectory are used to derive a series of wheel domain fuel consumption maps, each of which can be represented as a surface in a wheel speed (in meters per second) and wheel torque (in Newton-meters) plane, with the height of the surface representing fuel consumption (in liters per second). The gear shift schedule and the reference state trajectory are used to generate a set of gear usage weights. In an example, each of the gear usage weights is based on the probability of using the corresponding gear and the speed range associated with that gear. Each map in the wheel domain fuel consumption map set is weighted by its corresponding gear usage weight, and their sum is a blended wheel domain fuel consumption map.

Embodiments of the described technology generate low-level powertrain control commands in a computationally efficient manner by performing an optimization on the unique blended smooth wheel domain fuel consumption map instead of switching over multiple fuel consumption map sets and the gear shifting schedule. In this regard, the optimization problem does not handle multiple fuel maps with heuristic discontinuities. The blended wheel domain fuel consumption map is a smooth function plane that is generated using a local approximation of integer variables (e.g., the individual fuel consumption maps) and switching dynamics (e.g., the gear shifting schedule).

The fuel consumption objective is generated as a smooth function to ensure cost function derivatives on control decision variables are always continuous, which advantageously enables reductions in computation time, increases in memory efficiency, and improved solver convergence. Mathematically, a smooth function is a function that has continuous derivatives up to some desired order over some domain. In this example, the blended smooth wheel domain fuel consumption map has continuous derivatives up to the second order over the wheel velocity and wheel torque domains (e.g., as shown in FIG. 3).

Ideally, optimizing over the smooth function plane would be a close approximation of optimizing over the original hybrid system. In the described implementations, the optimization is carried out over a portion of the smooth function plane, e.g., an operating region corresponding to a particular gear and speed range, which results in a near optimal solution with regard to the original switching solution space with significant computational savings.

Since the switching is introduced by gearshifts, the smoothening method described separates the problem into two layers; layer 1 and layer 2, representing the wheel domain problem and engine domain problem, respectively. The wheel domain problem occurs after the gearbox, since the torque dynamic response at the driveshaft is continuous, but with switching cost functions and control input constraints. Continuous approximations are made to the cost function and control constraints, and the solved quasi-optimal results are used for the evaluation of switching locations. After the system switching locations have been determined in the wheel domain, the engine domain system functions can be settled, and the resulting cost function is smooth. Constraints can be set to enforce switch triggering at the right time and condition. The optimized control solution is optimal for the 2nd layer formulation, but since system switching determined at the 1st layer is quasi-optimal, the final solution is quasi-optimal with respect to the true system. The quality of 1st layer cost function and the continuous approximation of the control constraints determine how close the quasi-optimal solution is to the true optimal solution.

In some embodiments, the Layer 2 engine domain control optimization problem can be substituted with a direct wheel domain to engine domain actuation mapping through model inversions. This approach further reduces usage of vehicular onboard computation resources at the expense of minor control calculation result optimality degradation.

Figure 4:
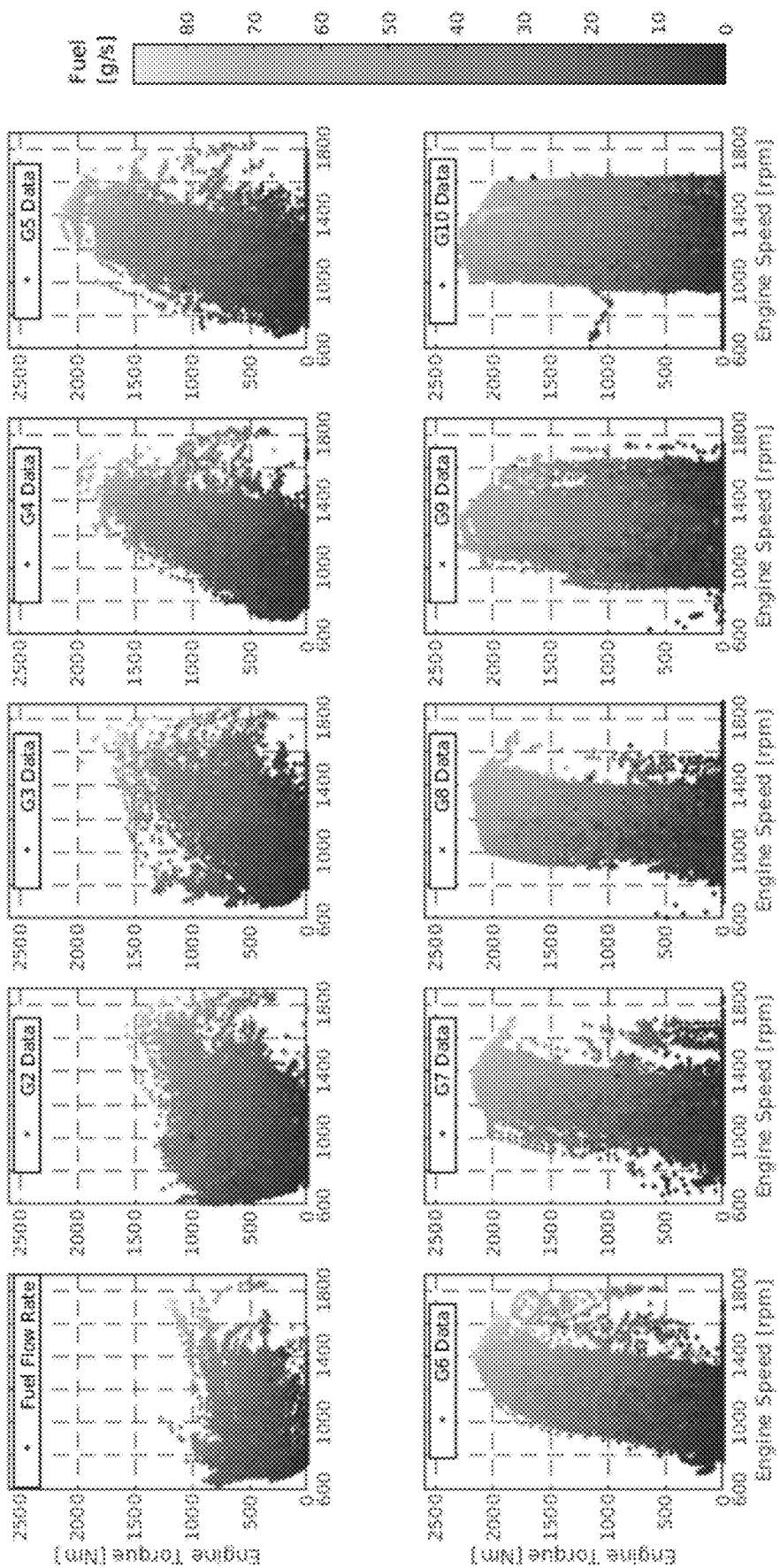
FIG. 4 shows experimental data for the engine domain fuel flow of each gear.
Figure 5:
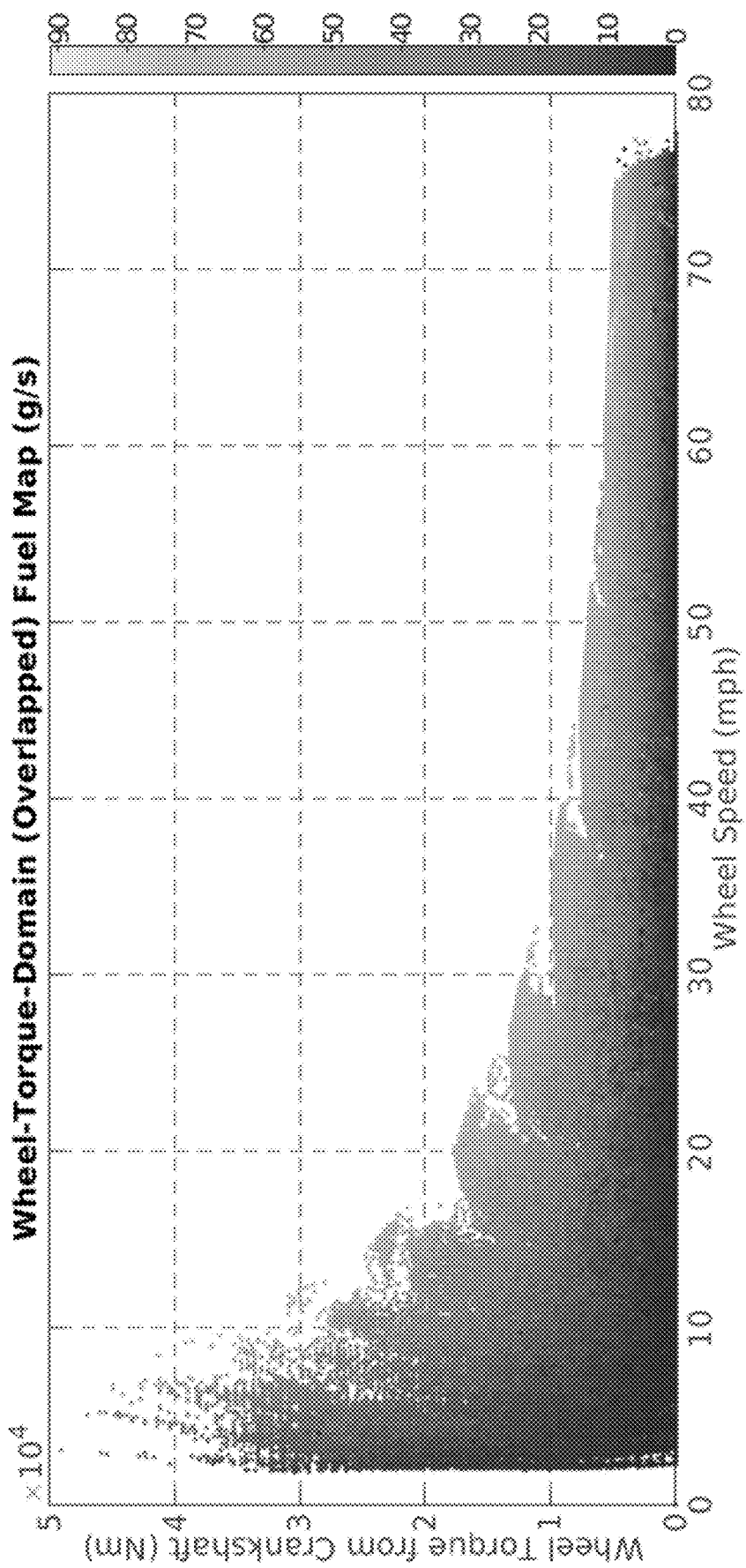
FIG. 5 shows experimental data for a projected wheel domain fuel flow.
Figure 6:
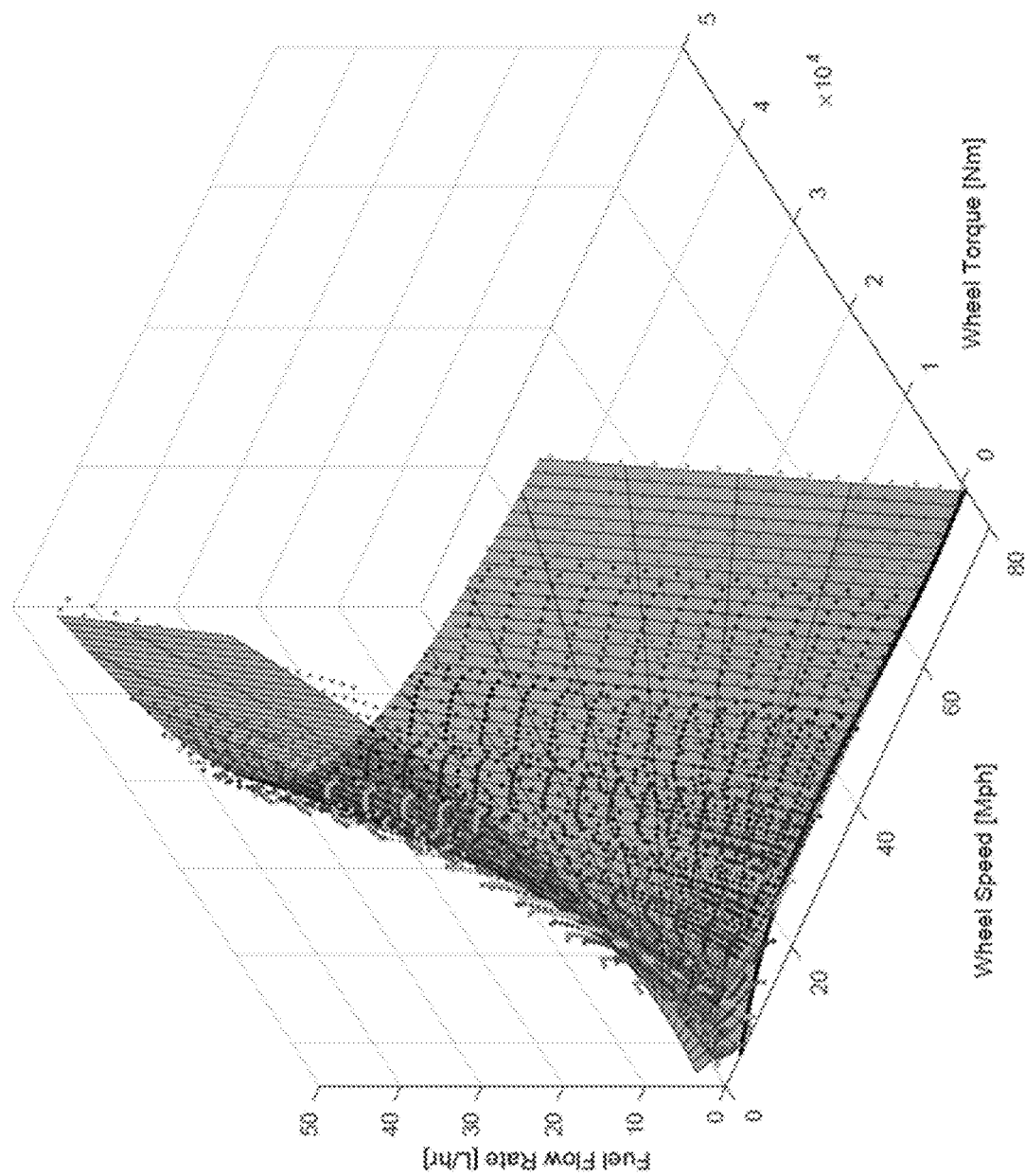
FIG. 6 shows an example of a wheel domain smoothed quadratic fuel consumption map.

In an example, FIG. 4 shows experimental data for the engine domain fuel flow of each gear of an engine with 10 gears (denoted G1-G10), which are inputs to the example method described in FIG. 3, and FIG. 6 shows the output of the method described in FIG. 3. In an example, the wheel domain smoothed quadratic fuel consumption map shown in FIG. 6 can be validated based on experimental data for a projected wheel domain fuel flow, which is shown in FIG. 5. As shown in FIG. 5, the projected fuel flows onto the wheel domain include overlaps among gears based on the upshifting and downshifting operations, which results in one single smooth plane over which the optimization can be performed.

According to some embodiments, MPC is advantageously used to solve the complex engine torque availability constraints with high computational accuracy and handle system switching caused by gear shifting and/or clutch engagements with high computational efficiency. Vehicle gear shifts or clutch operations result in the predictive torque-speed scheduling problem being a mixed integer programming problem (which is a known NP-hard problem). In addition, the fact that the control actuation range defined by engine torque capacity and engine friction curves are nonlinear and non-convex, results in a direct solution of such a problem being practically unattainable given the computation resources typically available on a vehicle.

In order to meet the practical vehicle online computation speed requirement, conventional techniques commonly oversimplify the true shape of engine torque availability curves as being box-shaped constraints, and/or scheduling torque usage across the horizon under the strong assumption of constant gear selection. Such approaches significantly reduce system model fidelity, and lead to a reduction in the control decision's credibility on motion feasibility or constraint compliance due to local violations of true actuation range, or a limit on the vehicle's motion capability due to being overly conservative and then heavily limiting the upper level system's achievable functionalities.

In contrast to these conventional techniques, the disclosed embodiments address the engine torque availability constraints using local affine approximation techniques and mapping the solver solution space from the engine domain with switching functions to the unitary smooth plane. In an example, this may be achieved by using operation region prior estimation and equivalent torque efficiency techniques. As a result, the control actuation solver described here only needs to handle a standard quadratic programming (QP) optimization problem, which is computationally fast and lightweight, and whose solution tracks the true vehicle system properties with regard to engine torque availability and gear shift schedules.

Figures 7A, 7B:
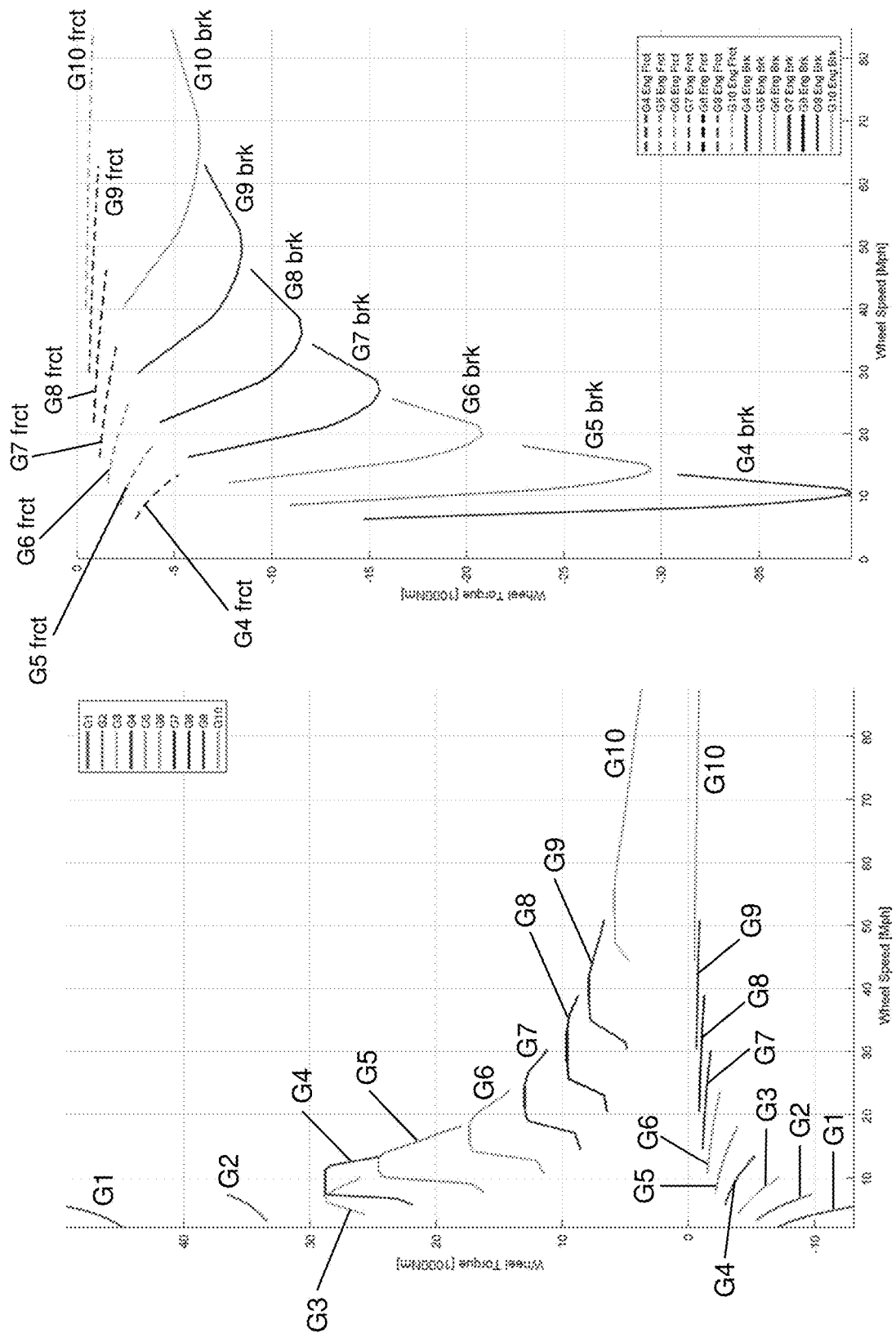
FIGS. 7A and 7B show numerical examples of unprocessed constraints on usable wheel combustion torque ranges and usable wheel brake torque ranges provided by the powertrain, respectively, of each gear, that cannot be directly handled by an optimization solver with online speed requirements.

FIGS. 7A and 7B show numerical examples of the constraints on usable wheel combustion torque ranges and usable engine brake wheel torque ranges, respectively, of each gear for an engine with 10 gears (denoted G1-G10). These numerical examples are realistic to the vehicle's actual mechanical capability with sufficient model accuracy for dynamic control purposes.

FIG. 7A shows the constrained usable wheel combustion torque ranges for the maximum engine speed range of each gear under a full-load powertrain strategy. As shown therein, wheel torque by engine combustion (also referred to as wheel combustion torque, denoted $T_{wc}$) is constrained as:

$$\min(T_{frct}(v,G)) \leq T_{wc} \leq \max(T_{wc\text{-}cap}(v,G)).$$

Herein, $T_{frct}$ is the driveline friction torque when coasting and $T_{wc\text{-}cap}$ is the wheel combustion torque capacity, which are both functions of the vehicle wheel speed (v) and the current gear of vehicle (G). Similarly, FIG. 7B shows the constrained usable engine brake wheel torque ranges of each permissible gear, without driveline friction torque deduction, under maximum engine speed range of each gear during engine brake. As shown therein, wheel torque by engine braking or foundation braking (also referred to as wheel braking torque, denoted $T_{wb}$) is constrained as:

$$\min(T_{wb-m}(v,G))-\min(T_{frat}(v,G))\approx T_{wb-lb}\leq T_{wb}\leq 0.$$

Herein, the constraints for the wheel braking torque are based on the additional brake torque needed in the wheel domain in addition to the driveline friction brake torque. Thus, the upper bound is 0 and the lower bound is the combination of driveline engine brake torque and foundation brake (solid lines in FIG. 7B denoted "G #brk" for gear #) torque minus the driveline friction brake torque (dashed lines in FIG. 7B denoted "G #fret" for gear #), which are both functions of the vehicle wheel speed (v) and the current gear of vehicle (G).

As shown in FIGS. 7A and 7B, the constraints are non-linear, disjoint and dependent on the gear, which are not optimization solver friendly. Embodiments of the disclosed technology use local affine approximations of these constraints to make the problem tractable and solvable in a computationally efficient manner. In an example, linear functions are used to locally approximate the constraints in FIGS. 7A and 7B, thereby resulting in a computationally efficient quasi-optimal solution. In some embodiments, the local affine approximation comprises first selecting anchor points (see FIG. 8) and then selecting a linear function (see FIG. 10).

Figure 8:
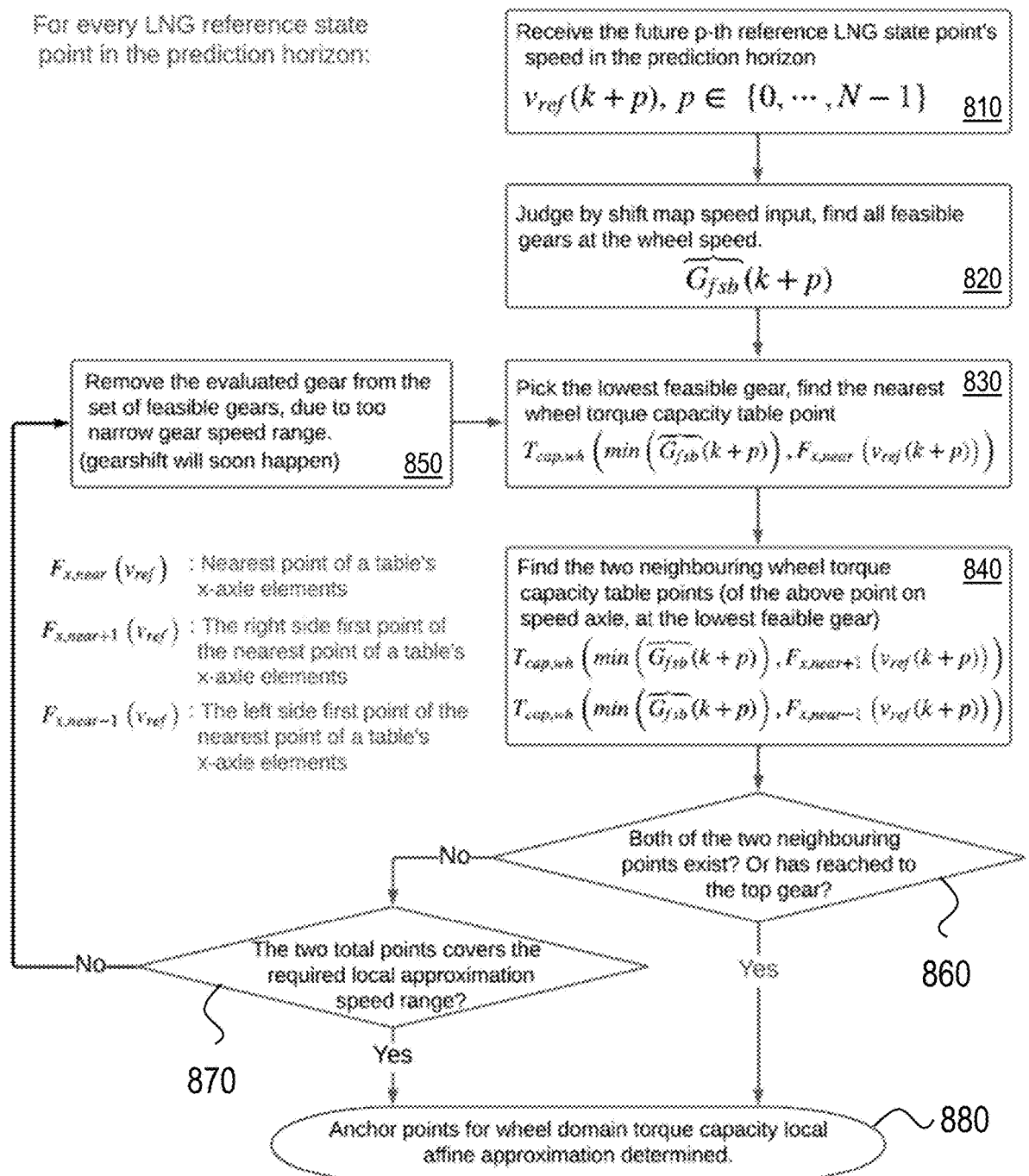
FIG. 8 shows a flowchart for anchor point selection for local affine approximation for generating usable wheel torque range constraints that are fit for online optimization solver speed requirements.

FIG. 8 shows a flowchart for anchor point selection on wheel domain torque capacity lines of various gears to perform local affine approximations, wherein two or three points are selected to construct the linear inequality constraints. The method shown in FIG. 8 is performed for each longitudinal dynamic MPC reference state point in the prediction horizon. The input to the process is a speed of a reference state point p steps into the prediction horizon (operation 810, wherein it is assumed that the current time index is k, and thus, the input is k+p). For this time index in the future, all feasible gears that correspond to this wheel speed are determined based on a gear shift map (operation 820). For the lowest feasible gear, the nearest wheel torque capacity is selected (operation 830), and its two neighboring wheel torque capacities are determined (operation 840). The following logic is used to select anchor points:

(1) If both of the neighboring points exist ("Yes" branch in operation 860), all three points are used for the local affine approximation (operation 880); or
(2) If only one neighboring point exists ("No" branch in operation 860)), both points are used if they cover the required speed range ("Yes" branch in operation 870); or
(3) If they do not cover the required speed range ("No" branch in operation 870), this implies that a gearshift is imminent, and the next lowest gear is selected to determine the anchor points (operation 850).

Figure 9A:
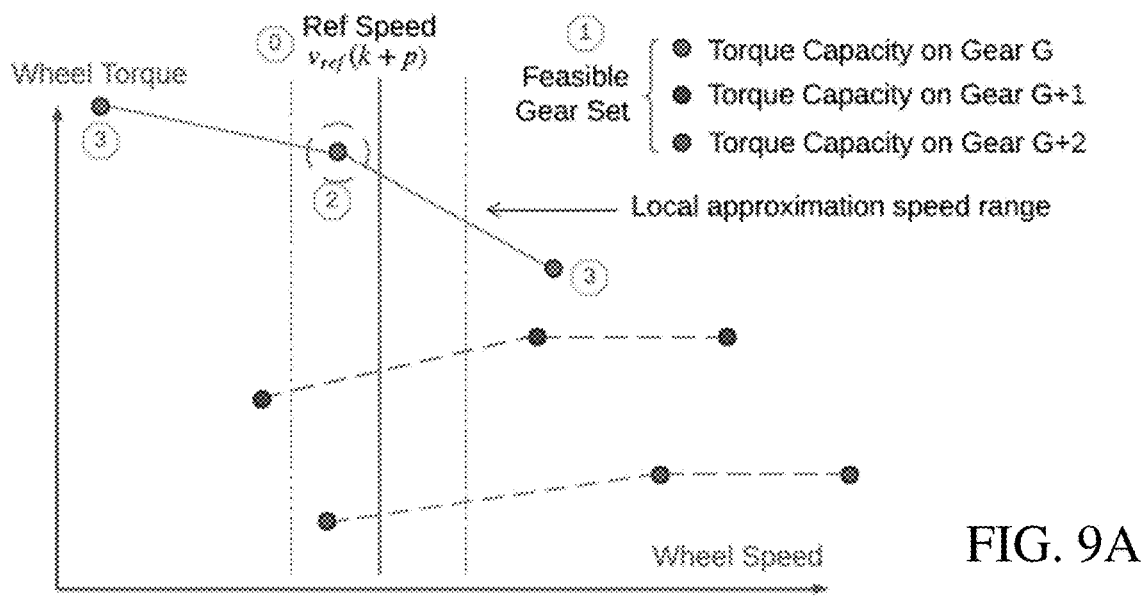
FIGS. 9A-9C show examples of anchor point selection for the flowchart of FIG. 8.
Figure 9B:
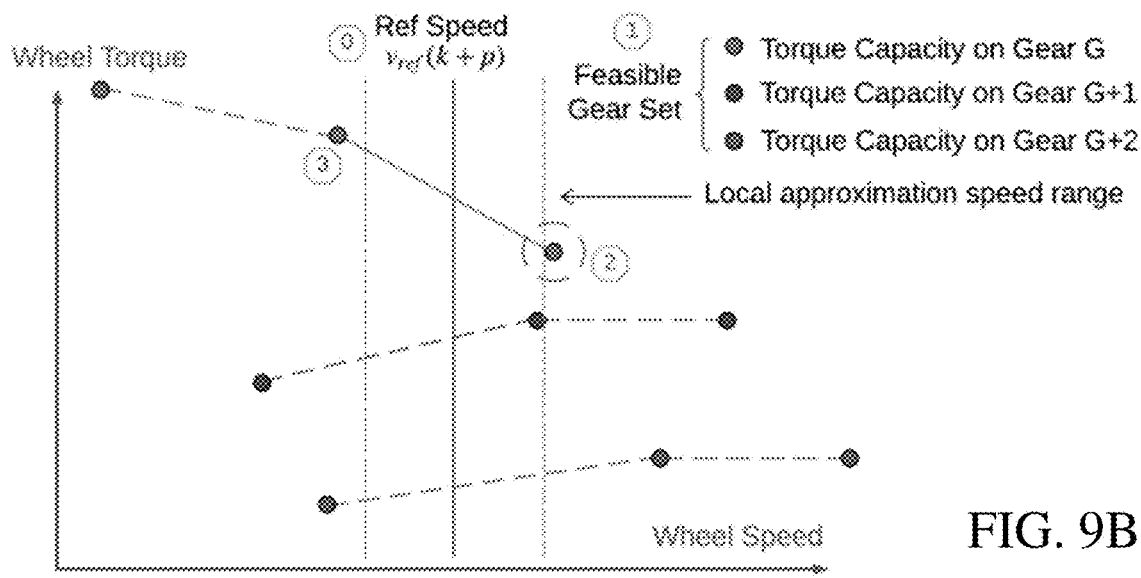
Figure 9C:
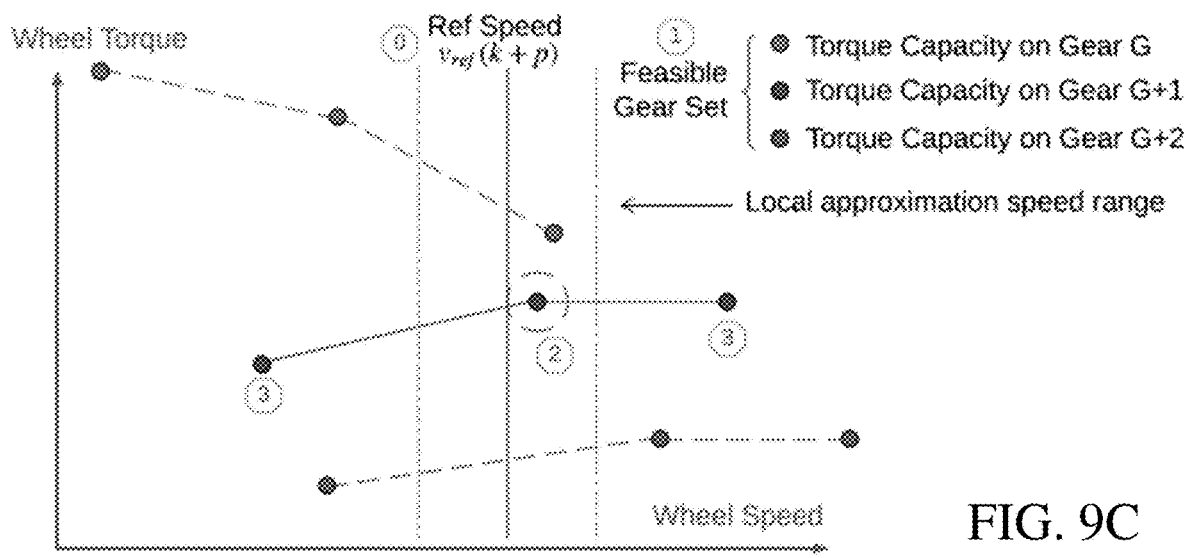

FIGS. 9A-9C show examples of anchor point selection for the flowchart shown in FIG. 8, wherein reference numbers "1", "2", "3" and "4" (shown within octagons in FIGS. 9A-9C) correspond to operations 810, 820, 830 and 840 in FIG. 8, respectively. In these examples, the solid lines are the selected active margins for the reference state point's local affine approximation and the dashed lines are the inactive margins. FIG. 9A shows an example wherein three points are selected for the local affine approximation because for the lowest feasible gear (G), both neighboring points are available for the wheel torque capacity nearest to the reference speed. FIG. 9B shows an example wherein two points are selected for the local affine approximation because for the lowest feasible gear (G), only one neighboring point is available, but the two points cover the required speed range. FIG. 9C shows an example wherein for the lowest gear (G), only one neighboring point is available, and the two points do not cover the required speed range. Thus, the next lowest feasible gear (G+1) is considered, and three points are selected (as in the case of FIG. 9A) for the local affine approximation.

Figure 10:
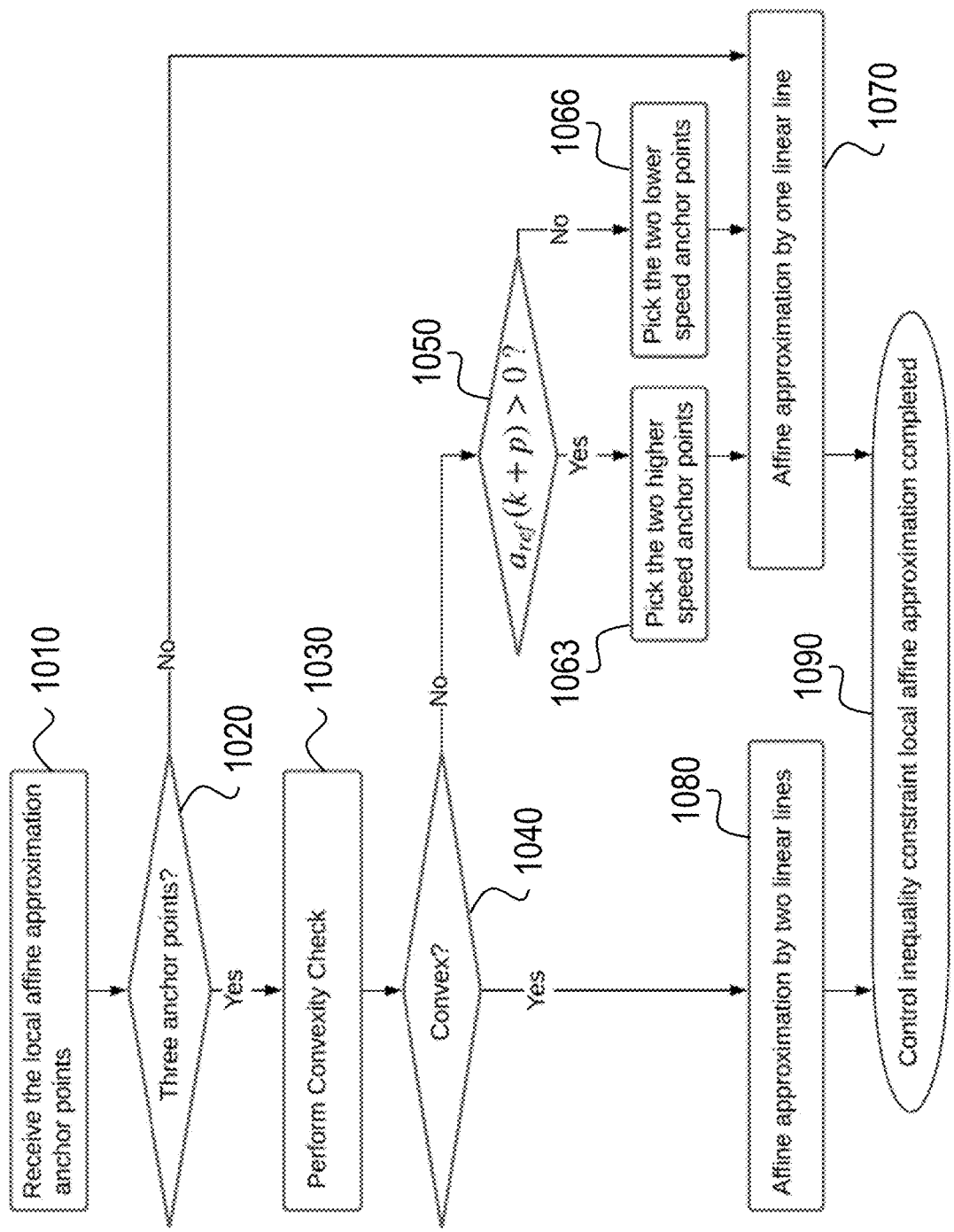
FIG. 10 shows a flowchart for linear function selection for local affine approximation.

FIG. 10 shows a flowchart for linear function selection on wheel domain torque capacity lines of various gears to perform local affine approximations. As shown therein, if three anchor points are selected ("Yes" branch in operation 1020) and pass a convexity check ("Yes" branch in operation 1040), then two linear lines are used for the local affine approximation (operation 1080). On the other hand, if only two anchor points are selected ("No" branch in operation 1020), or if the three anchor points fail the convexity check ("No" branch in operation 1040), then only one linear line is used for the local affine approximation (operation 1070). In the case that the three points fail the convexity check, the reference acceleration is checked for being greater than zero (operation 1050). If the reference acceleration is greater than zero, the two higher speed anchor points are selected (operation 1063), whereas if it is less than or equal to zero, the two lower speed anchor points are selected (operation 1066) to determine which single linear line is used for the local affine approximation (operation 1070).

Figure 11:
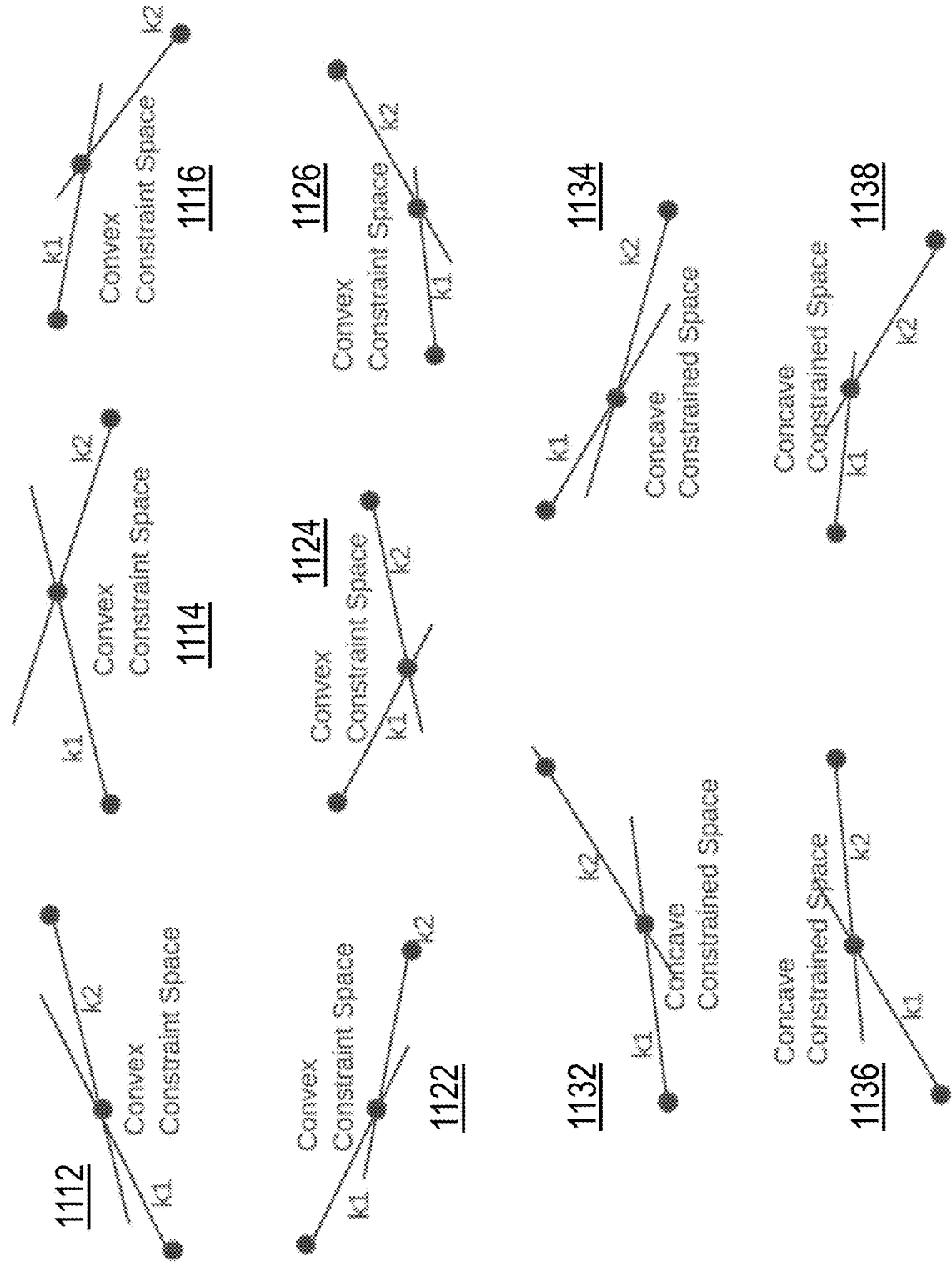
FIG. 11 shows examples of convex and concave constraint spaces and decisions based on line slope comparisons in local affine approximations.

In some embodiments, the convexity check in FIG. 10 can be performed by comparing the slopes of the two linear lines formed using the three anchor points. For the examples shown in FIG. 11, denote $k_1$ as the slope of the left-side linear line and $k_2$ as the slope of the right-side linear line. If the evaluated constraint serves as the upper bound (e.g., cases 1112, 1114 and 1116 in FIG. 11), then $k_1 \geq k_2$ implies the constraint space is convex. If the evaluated constraint serves as the lower bound (e.g., cases 1122, 1124 and 1126 in FIG. 11), then $k_1 \leq k_2$ implies the constraint space is convex. In other cases (e.g., cases 1132, 1134, 1136 and 1138 in FIG. 11), the constraint space is concave.

Figure 12:
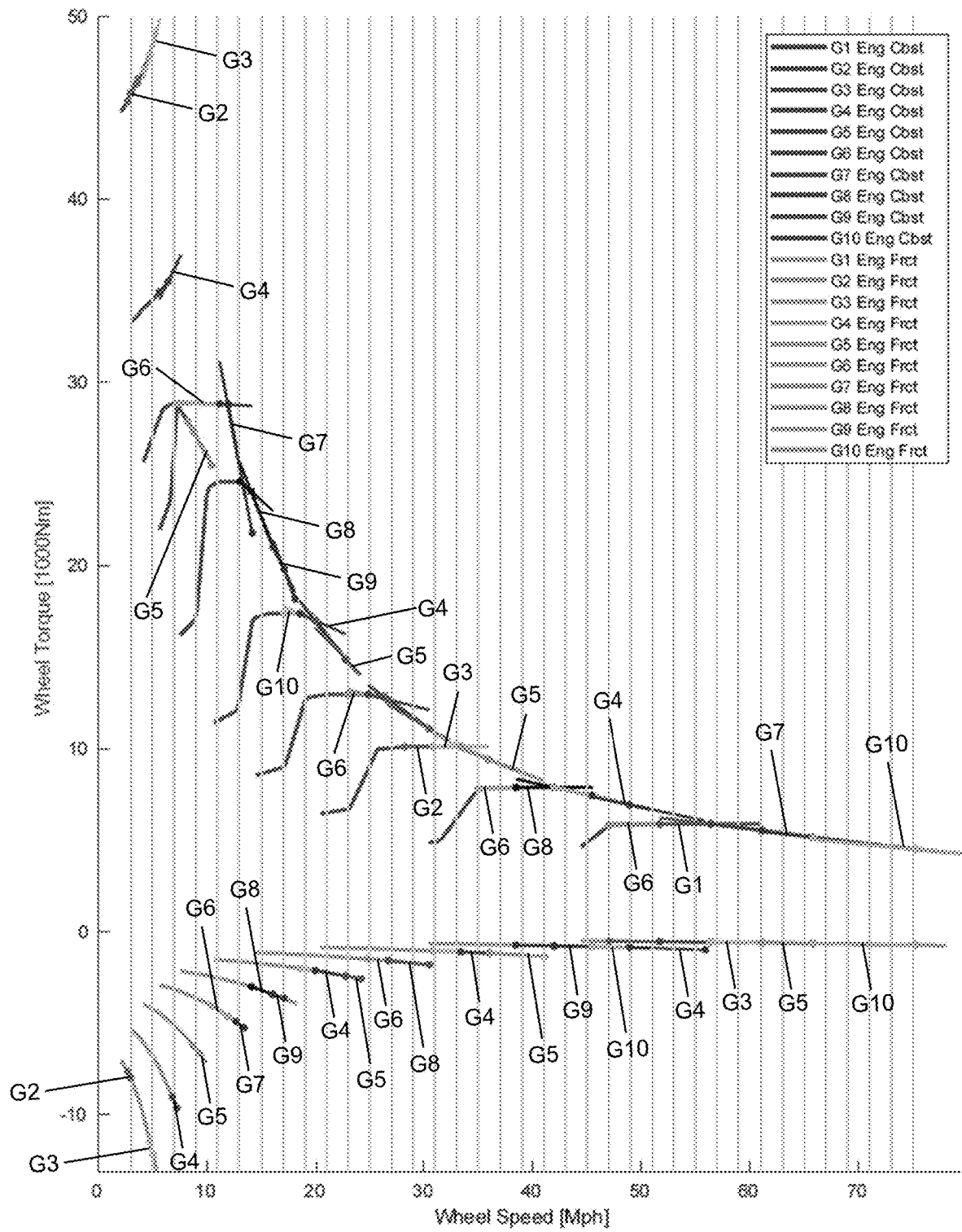
FIG. 12 shows examples of local affine approximated usable wheel torque ranges at various vehicle speed ranges that are inputs for a quadratic programming optimization solver.

FIG. 12 shows the verification examples of wheel torque range local affine approximations at every 2 mph wheel speed points, where the thin vertical lines locate the reference points on wheel torque capacity and transmission friction lines. As shown in FIG. 12, the short line segments corresponding to different gears are the linear line function (s) involved in the formulation of each local affine constraint approximation. The dots on the line segments are the selected table anchor points on which the convexity is checked and linear inequality constraints are generated. It can be seen that the designed local affine approximation well serves the constraint fidelity needed for each reference state local region.

Figure 13:
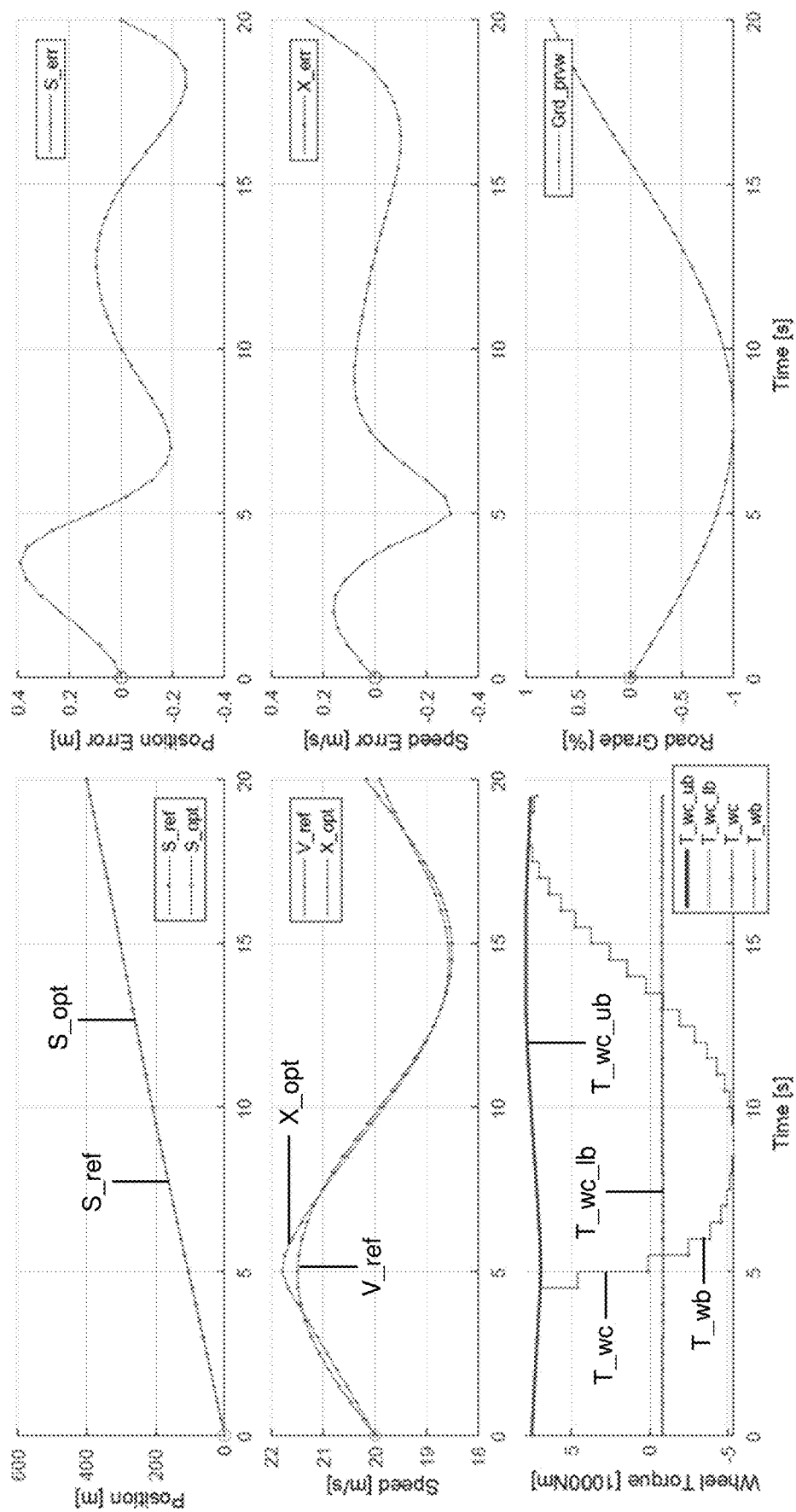
FIG. 13 shows an example of an optimal solution for a powertrain integrated predictive dynamic controller, which includes the output vehicle speed and wheel domain control actuations that are compliant with vehicle powertrain limitations and longitudinal dynamics for tracking a partially unfeasible sine wave speed trajectory.

FIG. 13 shows an example of an optimal solution for a powertrain integrated predictive dynamic controller, which includes the output vehicle speed and control actuations that are compliant with vehicle powertrain limitations and longitudinal dynamics for tracking a partially unfeasible sine wave speed trajectory. In an example, the speed and control actuation solutions plotted in FIG. 13 were obtained by integrating the derived affine constraints (e.g., derived using FIGS. 10 and 11) with the objective functions (e.g., as shown in FIG. 6) and applying a quadratic programming solver.

Embodiments of the disclosed technology provide, amongst other features and benefits, the following advantages:

Future state targets: The determined vehicle control actuations are optimal with respect to future control target trajectories and future vehicle state projections, whereas existing solutions can only determine vehicle control actuations in response to an instantaneous singular set of control targets and control state errors.

Multiple control objectives: The defined control law can be optimized for a plurality of objectives, such as tracking accuracy, motion smoothness, actuation cost (fuel economy and brake preserving), with contradictory objectives being self-resolved by the control solver, and with objectives not in need of optimization redefined into state constraints, such as vehicle stability and collision avoidance. In contrast, existing solutions can only define control laws explicitly optimized for a single target tracking objective, with other objectives (e.g., smoothness, stability, actuation cost, and the like) only being partially satisfied or indirectly satisfied by control gain tuning.

Constraint compliance: The determined control actuations that maintain vehicle states remain within the required constraint space when the constraints are feasible, such as vehicle stopping position, target speed in a finite amount of time, maximum/minimum vehicle driving speed, maximum/minimum vehicle acceleration, inter-vehicle distance requirement, etc. For situations when the constraints are infeasible, the described embodiments relax the infeasible constraint to a minimum amount while maximizing vehicle actuation capability usage, to ensure the existence of a solution while minimizing the risk caused by constraint violation.

In contrast, existing solutions cannot ensure a vehicle motion state stays within a required constraint space with a limited amount of actuation capability. Existing implementations typically require human drivers to be responsible for abnormalities in vehicle motion.

Actuation optimality: The control actuation decisions are optimized to a future horizon of the driving mission and projected vehicle states and are augmented by the SAE L4 autonomous driving perception and planning system's capability of handling multiple projects under complicated traffic contexts. Furthermore, the vehicle control actuations are optimized for a plurality of performance criteria and are optimized to balance contradictory objectives.

Application scenarios: The constrained motion capability and upper stream information handling advantageously enables coverage for the entire range of traffic scenarios of SAE L4 autonomous driving, which can involve intense traffic vehicle interactions and high control accuracy requirements in complicated real-world urban driving scenarios. In contrast, existing solutions use radar, LIDAR and camera systems that can only handle simple traffic contexts, which are typically limited to conventional cruise control or adaptive cruise control scenarios that are normally restricted to highway driving.

Actuation constraint fidelity: The local affine approximation technique can be used to approximate the engine torque availability constraints into combinations of affine functions that can be solved using a QP solver, thereby advantageously reducing the computational requirement, while ensuring accuracy of the constraint approximation with respect to the local solution space. Fidelity of local affine approximation prioritizes the near-term solution accuracy, exhibits a graceful degradation along the time horizon into the future, and is synchronized with the importance degradation and uncertainty propagation from the upper level prediction-planning results of the autonomous driving system.

In contrast, and due to the complicated nonconvex and nonlinear shape of engine torque capacity curve and engine friction curve, existing solutions that use MPC either oversimplify the constraint functions thereby sacrificing accuracy or employ approximations that use a set of nonlinear functions thereby sacrificing lower computational complexity.

System switch handling: The vehicle longitudinal dynamic transfer functions are mapped from the engine torque domain, linked by gear and/or clutch status, onto the wheel torque domain by converting the solution variables into the continuous range of estimated wheel torque. For engine domain related switching penalty maps (e.g., fuel consumption), the described embodiments blend the switching penalty maps into one unitary smooth penalty map function in the wheel domain, weighted by the feasibility and probability of the gear shift schedules.

The blended wheel domain solution space leverages knowledge of the most likely engine, gear, and/or clutch status for an average driving pattern when implementing the local affine approximation (instead of estimates of a plurality of switching states). In some embodiments, knowledge of a specific scenario (e.g., a specific city or time of day that the vehicle is operating in) may be leveraged to determine the most likely engine, gear and/or clutch status. This advantageously provides improved consistency and robustness than existing solutions.

In some embodiments, after the wheel domain solution is optimized by the solver, the solution can either be directly mapped to the engine domain actuations or be used to construct a secondary engine domain problem with gear/clutch state sequences being set and quasi-optimized. In an example, this determination may be based on the available computational resources and/or design priorities. The secondary engine domain control optimization includes a higher local penalty map fidelity, which leads to a minimal difference between the derived solution and the original global optimum (and would typically only be affected by the minor system switching time differences). Thus, the described embodiments derive solutions using only one or two standard QP problems, which can be implemented using reduced computational resources and in shorter times.

In contrast, existing solutions either approximate the switching functions with linear combinations of sigmoid functions, which only handle simple switching conditions and result in highly nonlinear optimizations (which typically require increased computational resources), or assume a static shifting sequence, which degrades the resulting solution because the quality depends on the particular estimate of gear/clutch status sequence.

Adaptive model parameters: The generation of the vehicle control actuation self-optimizes for any given vehicle model parameter set in a continuous range, as long as the input parameter set is within a reasonable range, thereby ensuring that performance does not degrade as the model parameters change. Furthermore, running an online vehicle model parameter adaptation and/or estimation process improves the derived solutions.

In contrast, existing solutions typically do not use MPC, and rely on an offline calibration of control parameters, which results in being able to accept only a limited number of vehicle system parameters that do not represent the continuously changing vehicle longitudinal dynamic response parameters under various sources of unmeasurable disturbances in real world. As a result, the control performance of existing solutions will degrade when current parameters fall outside or in between the predefined system parameters and calibration sets.

Computational performance: The approximation techniques described treat the system model with nearly complete local fidelity at the immediate time horizon, with the fidelity gracefully degrading as time proceeds further into the future. Using local affine approximations and blending multiple switching surfaces into one smooth surface based on probability and feasibility results in the optimization solver not needing to perform iterative local approximations that involve solving a number of nonlinear optimization sub-problems, but only needing to solve one or two standard QP problems. Furthermore, the optimization problem is always formulated to be convex, thereby leading to ultrafast computation times because the solver can be explicitly designed to solve convex QP problems.

Figure 14:
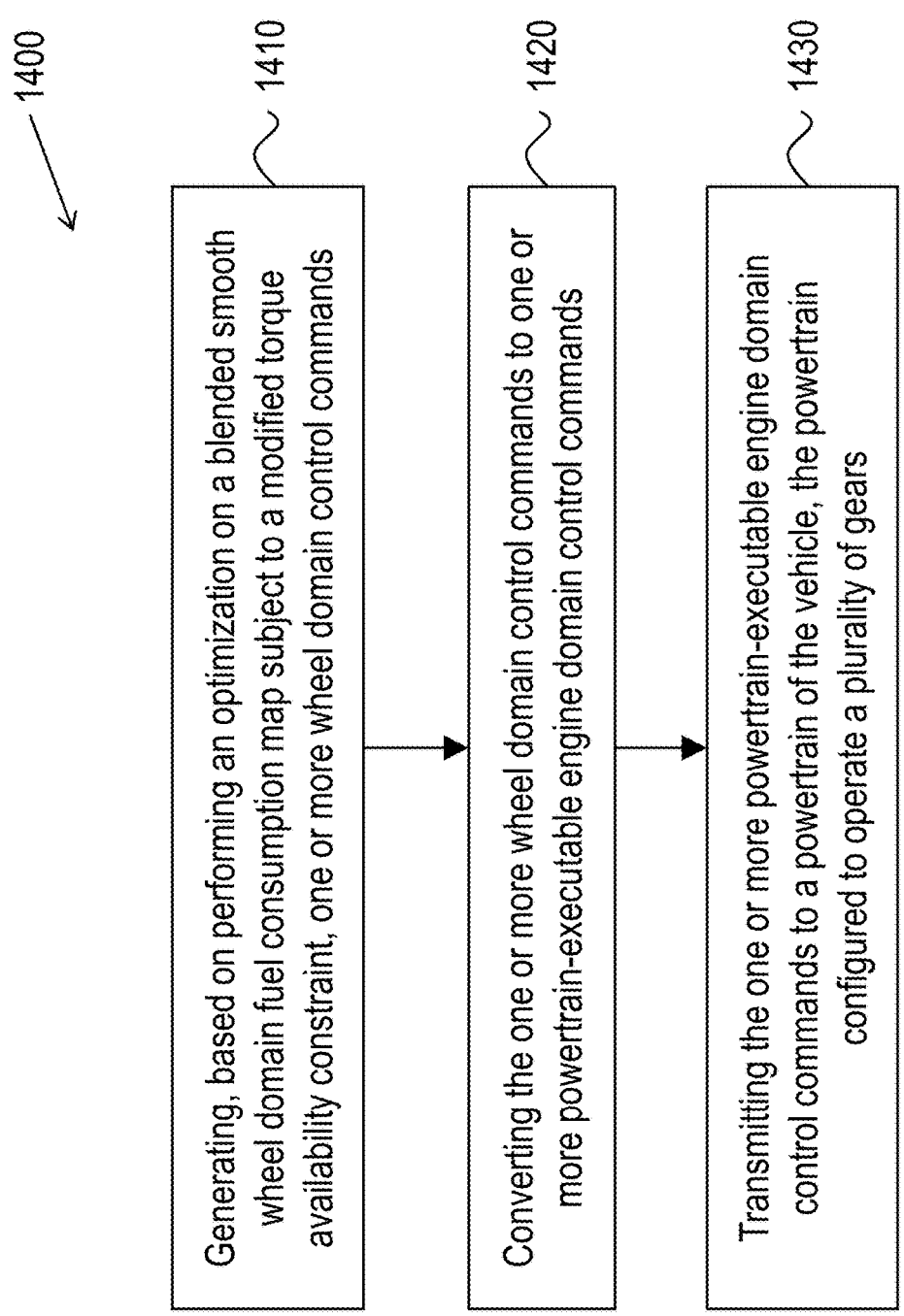
FIG. 14 shows a flowchart of an example method for controlling a vehicle.

FIG. 14 shows a flowchart for an example method 1400 for controlling a vehicle. The method 1400 includes, at operation 1410, generating, based on performing an optimization on a blended smooth wheel domain fuel consumption map subject to a modified torque availability constraint, one or more wheel domain control commands.

The method 1400 includes, at operation 1420, converting the one or more wheel domain control commands to one or more powertrain-executable engine domain control commands.

The method 1400 includes, at operation 1430, transmitting the one or more powertrain-executable engine domain control commands to a powertrain of the vehicle, the powertrain configured to operate a plurality of gears. In some embodiments, the one or more powertrain-executable engine domain control commands enable the vehicle to track a reference kinematic trajectory associated with a vehicle speed driving plan within a predetermined tolerance, and the modified torque availability constraint is based on applying a local affine approximation to a plurality of torque availability constraints, each of the torque availability constraints corresponding to each of the plurality of gears.

In some embodiments, the one or more wheel domain control commands are converted to one or more brake-executable engine domain control commands, and the one or more brake-executable engine domain control commands are transmitted to a brake system.

In some embodiments, the one or more powertrain-executable engine domain control commands and the one or more brake-executable engine domain control commands comprise at least one of an engine combustion torque request, a throttle pedal position request, an engine brake torque request, and a foundation air brake pressure request.

In some embodiments, the one or more wheel domain control commands comprise a wheel drive torque demand and a wheel brake torque demand.

In some embodiments, generating the one or more wheel domain control commands is further based on a plurality of control actuation demands comprising at least one of a throttle pedal position demand or an engine combustion torque demand, an engine brake torque demand, a gear position demand, and a foundation air brake pressure demand.

In some embodiments, and as shown in FIG. 3, the method 1400 further includes the operations of receiving an input comprising the reference kinematic trajectory and a plurality of engine domain fuel consumption maps, wherein the blended smooth wheel domain fuel consumption map is derived as a weighted sum approximation of the plurality of engine domain fuel consumption maps, each engine domain fuel consumption map corresponding to each of the plurality of gears.

In some embodiments, the one or more wheel domain control commands comprise wheel domain parameters.

In some embodiments, the wheel domain parameters comprise at least one of a wheel speed, a wheel drive torque, a wheel brake torque, a road grade angle, a longitudinal torque-acceleration response model, and a fuel consumption estimation model.

In some embodiments, the method 1400 further includes the operation of determining an availability range for the wheel torque based on the local affine approximation over multiple wheel torque capacity curves over the wheel speed for a subset of the plurality of gears. In an example, this operation is shown in FIGS. 9A-9C.

In some embodiments, the engine domain parameters comprise at least one of an engine speed, an engine flywheel torque, a foundation air brake pressure, a gear position, a transmission efficiency gain set, a clutch engagement status, a gear ratio set, and a final drive ratio.

In some embodiments, the vehicle is an autonomous vehicle operating in a SAE Level 4 (L4) automation mode.

In some embodiments, the optimization on the blended smooth wheel domain fuel consumption map comprises a convex optimization.

In some embodiments, the blended smooth wheel domain fuel consumption map is derived from a hybrid system comprising at least one continuous component corresponding to at least one gear of the plurality of gears and at least one discrete component corresponding to a gear shift from a first gear of the plurality of gears to a second gear of the plurality of gears.

In some embodiments, the converting comprises a transformation from an engine domain to a wheel domain.

In some embodiments, the engine domain comprises a switching system and the wheel domain comprises a continuous system.

In some embodiments, the optimization is based on a model predictive control (MPC) framework that generates the one or more control commands for a current time and a finite time-horizon subsequent to the current time.

Figure 15:
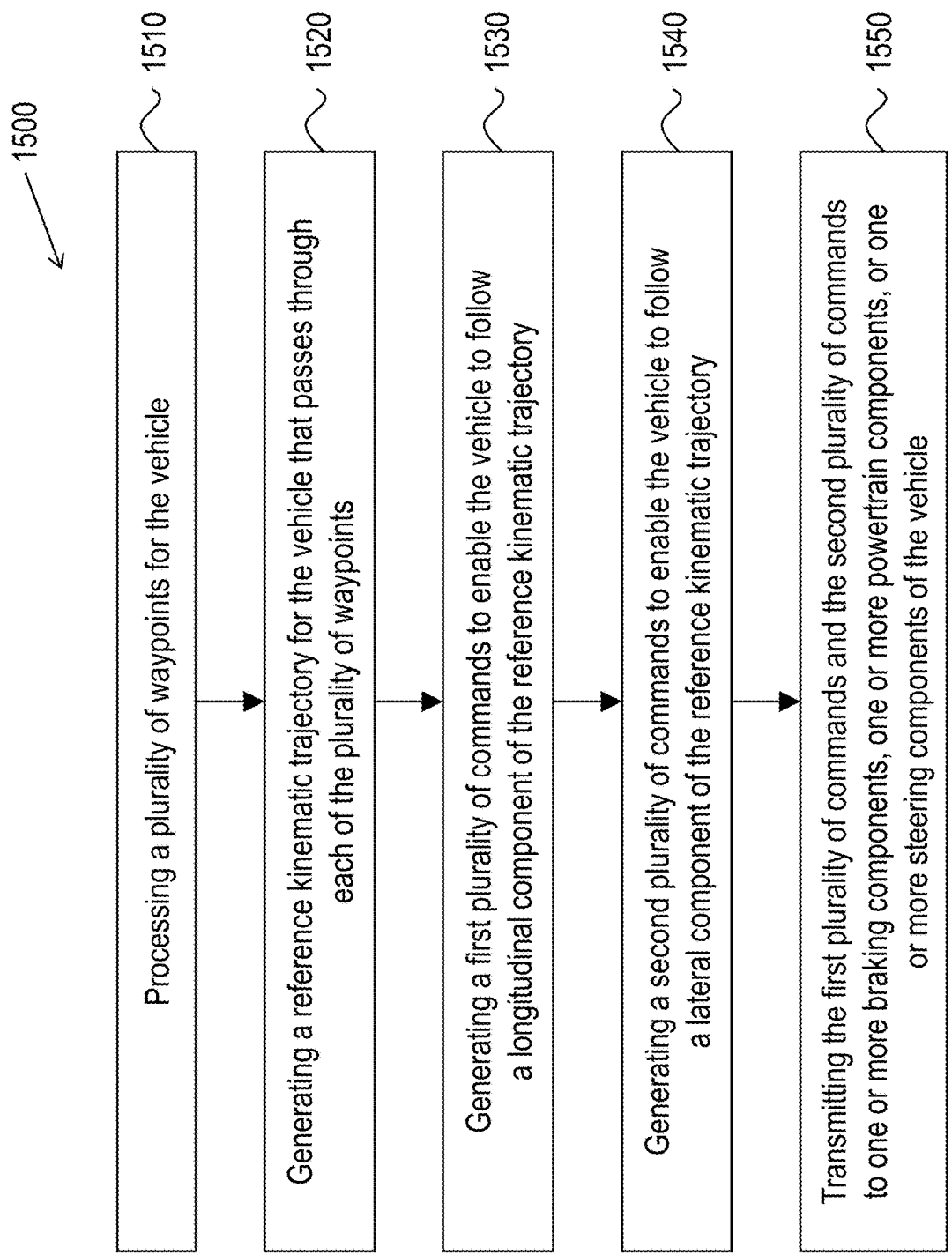
FIG. 15 shows a flowchart for another example method for controlling a vehicle.

FIG. 15 shows a flowchart for an example method 1500 for controlling a vehicle. The method 1500 includes, at operation 1510, processing a plurality of waypoints for the vehicle.

The method 1500 includes, at operation 1520, generating a reference kinematic trajectory for the vehicle that passes through each of the plurality of waypoints.

The method 1500 includes, at operation 1530, generating a first plurality of commands to enable the vehicle to follow a longitudinal component of the reference kinematic trajectory.

The method 1500 includes, at operation 1540, generating a second plurality of commands to enable the vehicle to follow a lateral component of the reference kinematic trajectory.

In some embodiments, operation 1530 and operation 1540 may be performed concurrently, resulting in the first plurality of commands and the second plurality of commands being generated at substantially the same time.

The method 1500 includes, at operation 1550, transmitting the first plurality of commands and the second plurality of commands to one or more braking components, one or more powertrain components, or one or more steering components of the vehicle. In some embodiments, a first set of computations for generating of the first plurality of commands is independent of a second set of computations for generating the second plurality of commands.

In some embodiments, the reference kinematic trajectory comprises a lateral speed reference trajectory and a longitudinal speed reference trajectory that are derived based on the vehicle passing through each of the plurality of waypoints being a time critical mission, as shown in FIGS. 1 and 2.

In some embodiments, the first plurality of commands comprises one or more of an estimated gear sequence, an engine combustion torque solution, an engine brake torque solution, and a foundation brake air pressure solution.

In some embodiments, the vehicle is an autonomous vehicle is operating in a SAE Level 4 (L4) automation mode, and wherein a time horizon of the plurality of waypoints is based on a perception module and a planning module on the SAE L4 automation mode.

In some embodiments, generating the first plurality of commands comprises generating, based on a plurality of gear usage weights corresponding to a sequence of gear shifts for a plurality of gears, a blended smooth wheel domain fuel consumption map as a weighted sum approximation of a plurality of engine domain fuel consumption maps, each of the plurality of engine domain fuel consumption maps corresponding to each of the plurality of gears, and the sequence of gear shifts enabling the vehicle to track a reference kinematic trajectory within a predetermined tolerance, and generating, based on performing an optimization on the blended smooth wheel domain fuel consumption map, the second plurality of control commands.

In some embodiments, each of the plurality of gear usage weights are based on a speed range and a probability for a corresponding gear of the plurality of gears.

In some embodiments, the optimization on the blended smooth wheel domain fuel consumption map comprises a quadratic programming (QP) optimization.

Figure 16:
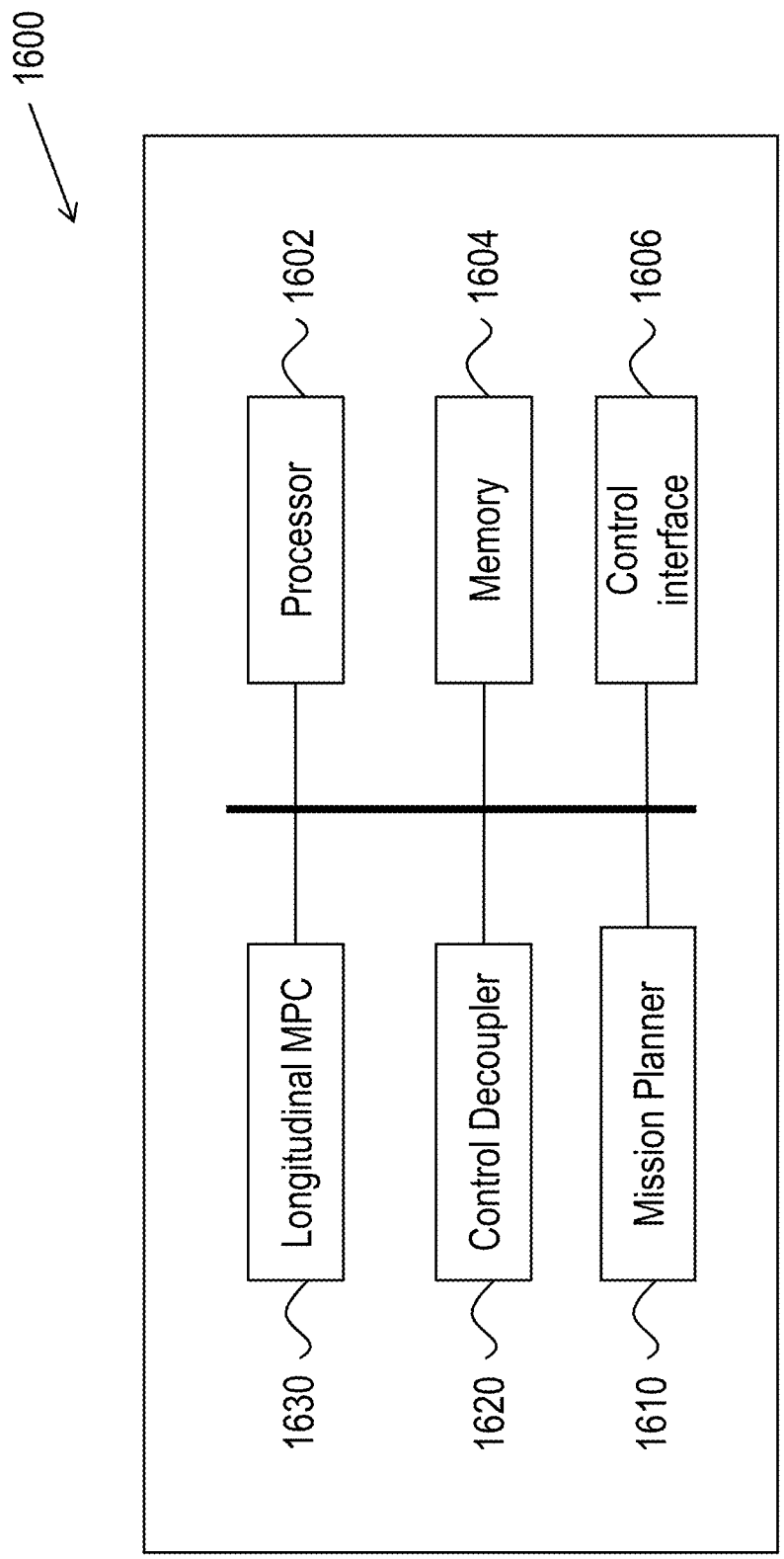
FIG. 16 shows an example of a hardware platform that can implement some methods and techniques described in the present document.

FIG. 16 shows an example of a hardware platform 1600 that can be used to implement some of the techniques described in the present document. For example, the hardware platform 1600 may implement methods 1400 or 1500 or may implement the various modules described herein. The hardware platform 1600 may include a processor 1602 that can execute code to implement a method. The hardware platform 1600 may include a memory 1604 that may be used to store processor-executable code and/or store data. The hardware platform 1600 may further include a control interface 1606. For example, the control interface 1606 may implement one or more intra-vehicular communication protocols. The hardware platform may further include a mission planner 1610, a control decoupler 1620 and a longitudinal MPC 1630. In some embodiments, some portion or all of the mission planner 1610, the control decoupler 1620 and/or the longitudinal MPC 1630 may be implemented in the processor 1602. In other embodiments, the memory 1604 may comprise multiple memories, some of which are exclusively used by the mission planner, control decoupler and/or longitudinal MPC.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for controlling a vehicle, comprising:
    generating, based on an optimization on a wheel domain fuel consumption map subject to a modified torque availability constraint, one or more wheel domain control commands,
        wherein the wheel domain fuel consumption map is a weighted sum approximation of a plurality of engine domain fuel consumption maps,
        wherein the modified torque availability constraint is based on applying a local affine approximation to a plurality of torque availability constraints; and
    causing the vehicle to track a reference kinematic trajectory associated with a vehicle speed driving plan within a predetermined tolerance based on one or more powertrain-executable engine domain control commands corresponding to the one or more wheel domain control commands.

2. The method of claim 1, wherein the wheel domain fuel consumption map has continuous derivatives up to a second order over a wheel velocity and wheel torque domains.

3. The method of claim 1, wherein the wheel domain fuel consumption map corresponds to a smooth function plane generated using a local approximation of integer variables and a gear shift schedule of the vehicle.

4. The method of claim 3, further comprising:
    performing the optimization over a portion of the smooth function plane corresponding to a particular gear and speed range.

5. The method of claim 1, wherein the wheel domain fuel consumption map is represented as a surface in a wheel speed and wheel torque plane with a height of the surface representing a fuel consumption.

6. The method of claim 1, further comprising:
    receiving an input comprising the reference kinematic trajectory, the plurality of engine domain fuel consumption maps corresponding to a plurality of gears.

7. The method of claim 1, wherein the causing the vehicle to track the reference kinematic trajectory includes transmitting the one or more powertrain-executable engine domain control commands to a powertrain of the vehicle.

8. The method of claim 1, wherein the plurality of engine domain fuel consumption maps corresponds to a plurality of gears and wherein a torque availability constraint corresponds to each of the plurality of gears.

9. A system for controlling a vehicle, comprising:
    a control decoupler included in a vehicle control module and configured to generate a reference kinematic trajectory for the vehicle that passes through each of a plurality of waypoints for the vehicle;
    a longitudinal dynamic model predictive control (MPC) controller operably connected to the control decoupler and configured to generate a first plurality of commands to enable the vehicle to follow a longitudinal component of the reference kinematic trajectory;
    a lateral dynamic controller operably connected to the control decoupler and configured to generate a second plurality of commands to enable the vehicle to follow a lateral component of the reference kinematic trajectory; and
    wherein the MPC controller is further configured to generate, based on a plurality of gear usage weights corresponding to a sequence of gear shifts for a plurality of gears, a wheel domain fuel consumption map subject to a modified torque availability constraint as a weighted sum approximation of a plurality of engine domain fuel consumption maps, wherein the modified torque availability constraint is based on applying a local affine approximation to a plurality of torque availability constraints, and
    wherein the second plurality of commands are generated based on performing an optimization on the wheel domain fuel consumption map to allow the vehicle to track a reference kinematic trajectory associated with a vehicle speed driving plan within a predetermined tolerance based on the second plurality of commands.

10. The system of claim 9, wherein the reference kinematic trajectory comprises a lateral speed reference trajectory and a longitudinal speed reference trajectory that are based on the vehicle passing through each of the plurality of waypoints being a time critical mission.

11. The system of claim 9, wherein the first plurality of commands comprises an estimated gear sequence, an engine combustion torque solution, an engine brake torque solution, or a foundation brake air pressure solution.

12. The system of claim 9, wherein the vehicle is an autonomous vehicle is operating in a Society of Automotive Engineers (SAE) Level 4 (L4) automation mode, and wherein a time horizon of the plurality of waypoints is based on a perception module and a planning module on the SAE L4 automation mode.

13. The system of claim 9, wherein the plurality of engine domain fuel consumption maps corresponds to the plurality of gears, and the sequence of gear shifts enabling the vehicle to track a reference kinematic trajectory within a predetermined tolerance.

14. The system of claim 13, wherein each of the plurality of gear usage weights are based on a speed range and a probability for a corresponding gear of the plurality of gears.

15. The system of claim 13, wherein the optimization on the wheel domain fuel consumption map comprises a quadratic programming (QP) optimization.

16. An apparatus for controlling a vehicle, comprising:
    a processor configured to:
        generate, based on performing an optimization on a wheel domain fuel consumption map subject to a modified torque availability constraint, one or more wheel domain control commands, wherein the wheel domain fuel consumption map is a weighted sum approximation of a plurality of engine domain fuel consumption maps, wherein the modified torque availability constraint is based on an application of a local affine approximation to a plurality of torque availability constraints; and cause the vehicle to track a reference kinematic trajectory associated with a vehicle speed driving plan within a predetermined tolerance based on one or more powertrain-executable engine domain control commands corresponding to the one or more wheel domain control commands.

17. The apparatus of claim 16, wherein the processor is further configured to transmit the one or more powertrain-executable engine domain control commands to a powertrain of the vehicle.

18. The apparatus of claim 16, wherein the one or more wheel domain control commands comprise wheel domain parameters that comprise a wheel speed, a wheel drive torque, a wheel brake torque, a road grade angle, a longitudinal torque-acceleration response model, or a fuel consumption estimation model.

19. The apparatus of claim 16, wherein the one or more wheel domain control commands comprise wheel domain parameters that comprise an engine speed, an engine flywheel torque, a foundation air brake pressure, a gear position, a transmission efficiency gain set, a clutch engagement status, a gear ratio set, or a final drive ratio.

20. The apparatus of claim 16, wherein the wheel domain fuel consumption map corresponds to a smooth function plane generated using a local approximation of integer variables and a gear shift schedule of the vehicle.

* * * * *